United States Patent [19]
Gray

[11] 3,716,706
[45] Feb. 13, 1973

[54] PIECE COUNTING SYSTEM

[75] Inventor: Alden J. Gray, Wallingford, Vt.

[73] Assignee: Howe Richardson Scale Company, Clifton, N.J.

[22] Filed: April 1, 1971

[21] Appl. No.: 130,291

[52] U.S. Cl. ................235/151.33, 177/25, 177/200
[51] Int. Cl. ..........................................G01g 19/413
[58] Field of Search ............235/151.33; 177/25, 200

[56] References Cited

UNITED STATES PATENTS 3,552,511   1/1971   Marcheso et al. ...........235/151.33 X

*Primary Examiner*—Eugene G. Botz
*Assistant Examiner*—R. Stephen Dildine, Jr.
*Attorney*—William A. Strauch et al.

[57] ABSTRACT

A piece counting system for determining the number of pieces in a lot by recurrently advancing a counter circuit from a predetermined starting count to coincidence with a digital signal that represents the weight of a known number of said pieces and by supplying a quotient signal each time coincidence is reached until the summation of counts that the counter circuit has been advanced by becomes equal to or greater than a digital signal representing the weight of the unknown number of pieces.

20 Claims, 12 Drawing Figures

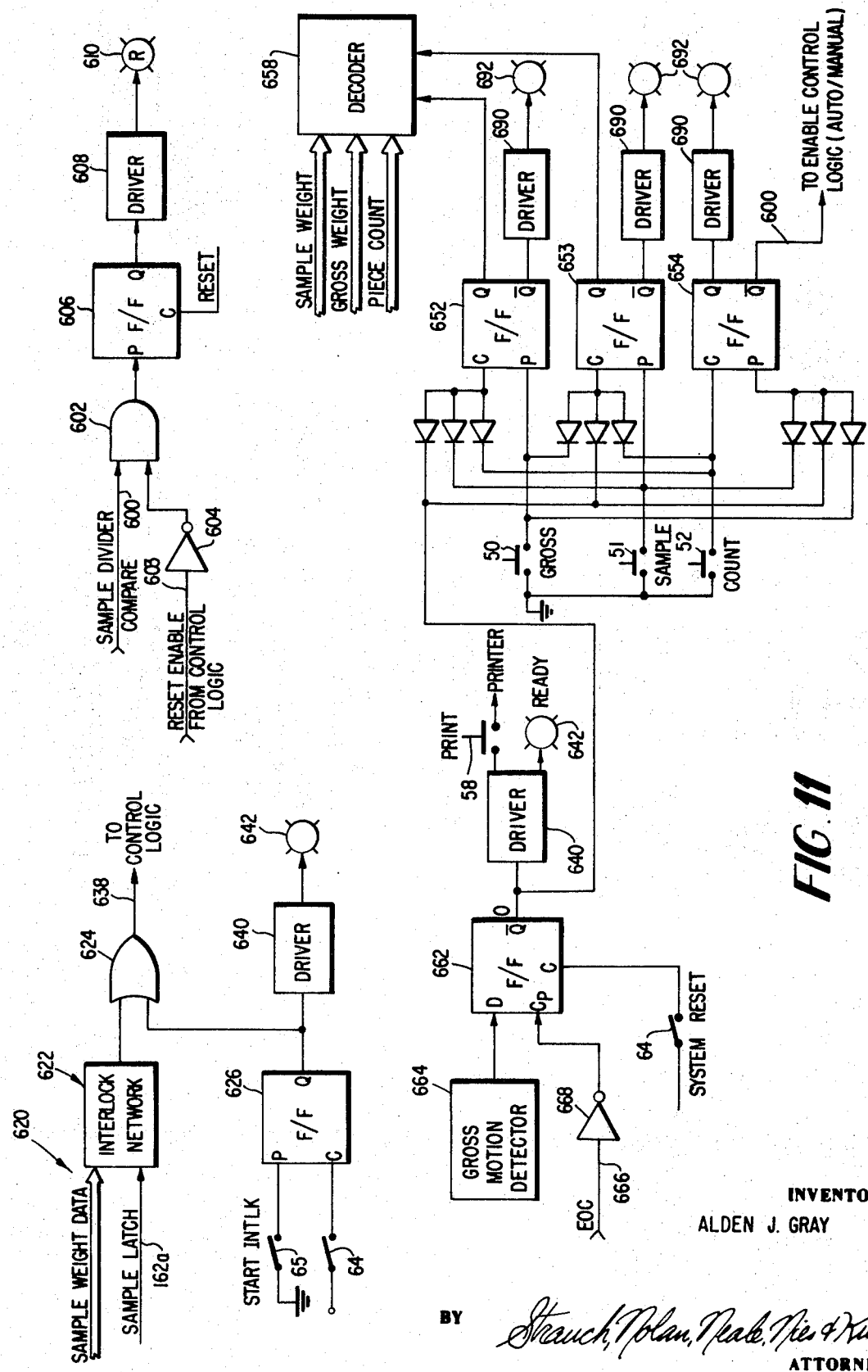

PIECE COUNTING SYSTEM

FIELD OF INVENTION

This invention relates to weighing systems and more particularly to piece counting systems in which the number of pieces or parts in a given lot is determined by weight. Typically, the number of pieces in a gross lot is determined by placing the lot on one scale and by placing a sample piece on another scale. The piece counting system is responsive to the weights on the two scales to provide a determination of the number of pieces in a gross lot.

SUMMARY AND OBJECTS OF INVENTION

One of the major objects of this invention is to provide a novel piece counting system which employs digital techniques to accurately determine the number of pieces in a gross lot in response to the weight of the gross lot and the weight of a known number of the pieces in a sample lot. The pieces to be counted by such a counting system are required to have substantially identical weights.

A more specific object of this invention is to provide a novel piece counting system in which the number of pieces in a gross lot is determined by a digital comparison technique.

The preceding object is accomplished by comparing the weight of one or more pieces in a sample lot with an output supplied by a first counter circuit, by advancing the first counter circuit with counts until comparison with the sample lot weight is achieved, by providing a second counter circuit which counts in the same number of counts counted in by the first counter circuit, by continuously comparing the output of the second counter circuit with the weight of the gross lot, by periodically resetting the first counter circuit to cyclically repeat the comparison between the output of the first counter circuit and the weight of the sample as long as the output of the second counter circuit is not equal to or greater than the weight of the gross lot, by supplying a quotient count signal each time coincidence is achieved between the output of the first counter circuit and the weight of the sample lot, by counting the number of supplied quotient count signals for a read-out, by enabling the second counter circuit to count in a summation of all of the counts that are counted in by the first counter, and by terminating the count-compare cyclic operation when the output of the second counter circuit becomes equal to or greater than the weight of the gross lot. This circuitry provides for rapid and reliable counting.

From the foregoing, it will be appreciated that the count-compare circuit of this invention has the mathematical effect of dividing the weight of the gross lot by the weight of the sample lot and that the number of quotient count signals is closely proportional to the quotient of the foregoing division. In effect, a digital representation of the weight of the sample lot is repeatedly and additively loaded into the second counter circuit until the output of the second counter circuit becomes equal to or greater than the weight of the gross lot, and each time the loading of the sample lot digital representation is completed a quotient count signal is produced.

The counting system of this invention also includes a gross weight scale for supplying the weight of the pieces in the gross lot and a sample weight scale for supplying the weight of the piece or pieces in the sample lot. Load cells or other suitable transducers at the gross and sample scales develop analog or other signals that are respectively functions of the weights of the gross and sample lots. The analog signals are conditioned and then converted into separate gross and sample digital signals, and the gross and sample digital signals are stored for application in the previously described comparison operations.

According to another object of this invention, the number of pieces in the sample lot may selectively be varied, and the counting system of this invention may selectively be programmed to accommodate the selected number of sample pieces that are placed by an operator on the sample scale. For example, the programming may accommodate any one of the following numbers of sample pieces: 1, 2, 5, 10, 20 and 100. The operator selects from this group of numbers the number of sample pieces to be placed on the sample scale, and he then positions a multi-position sample quantity selector switch to a position corresponding to the selected number of sample pieces that are placed on the sample scale. This sample quantity selector switch programs the selected sample pieces into a quotient count register which contains the circuitry for counting the previously described quotient count signals. The quotient count register has the mathematical effect of multiplying the number of counted quotient count signals by the number to which the sample quantity selector switch is set. As a result, the information read out of the quotient count register will be equivalent to the number of pieces on the gross scale or, in accordance with another object of this invention, to the total number of pieces on both the gross scale and the sample scale.

In accomplishing the last mentioned object of this invention, a switch is selectively actuable to preset or pre-load the quotient count register with a number of counts that is equivalent to the number selected on the sample quantity selector switch. Then when the quotient count signals are supplied as a result of the previously mentioned count-compare cycles, they will be added to the number of counts that were preset into the quotient count register.

According to another feature of this invention, the counting system is capable of repeatedly up-dating the piece count as pieces are loaded onto the gross scale. Furthermore, logic is provided to recycle the entire counting operation either selectively or in response to various conditions such as readjustment of the sample quantity selector switch during a counting cycle or detection of motion of the sample scale platform. The logic mentioned above also includes circuitry that prevents an unintentional division by zero.

In addition to the foregoing, the data representing the weight of pieces on the gross scale, the data representing the weight of the pieces on the sample scale and the data representing the piece count are electrically stored in the counting system of this invention in such a manner that they may selectively and individually be read-out in either visual or printed form.

Furthermore, a switching arrangement is provided in the counting system of this invention to selectively provide for either a tared or an un-tared read-out of the load on the gross scale. With regard to this aspect of the invention, the pieces making up the gross lot may be placed in a container on the gross scale. The weight of the container is tared out to provide a signal that is proportional to the weight of the pieces in the container, and the above-mentioned switching arrangement is selectively actuatable to provide a read-out of the total weight of the container and pieces on the gross scale when such information is desired.

According to another object of this invention only one analog-to-digital converter is employed for converting the analog weight-representing signals from both the gross scale and the sample scale. This is accomplished by a time sharing and switching circuit arrangement which enables the converter to alternatively and cyclically sample the two analog signals from the gross and sample scales respectively.

In the following description a logic or logical 1 or a "high" designates a positive d.c. signal voltage such as, for example, +5v. A logic or logical 0 or a "low" designates a substantially zero d.c. signal voltage. The disclosure herein assumes positive logic purely for the purpose of description. Also, unused terminals for the illustrated components in the system of this invention are connected to proper logic source states.

Further objects of this invention will appear as the description proceeds in connection with the appended claims and below-described drawings.

DESCRIPTION OF DRAWINGS

FIG. 10 is a circuit diagram of the sample quantity preset circuit shown in FIG. 8;

FIG. 11 is a circuit diagram of the data selector circuit shown in FIG. 2; and

In the annexed drawings, certain NAND gates are shown to have both inputs connected to a common conductor. Such NAND gates, it will be appreciated, simply act as inverters.

DETAILED DESCRIPTION

Figure 1:
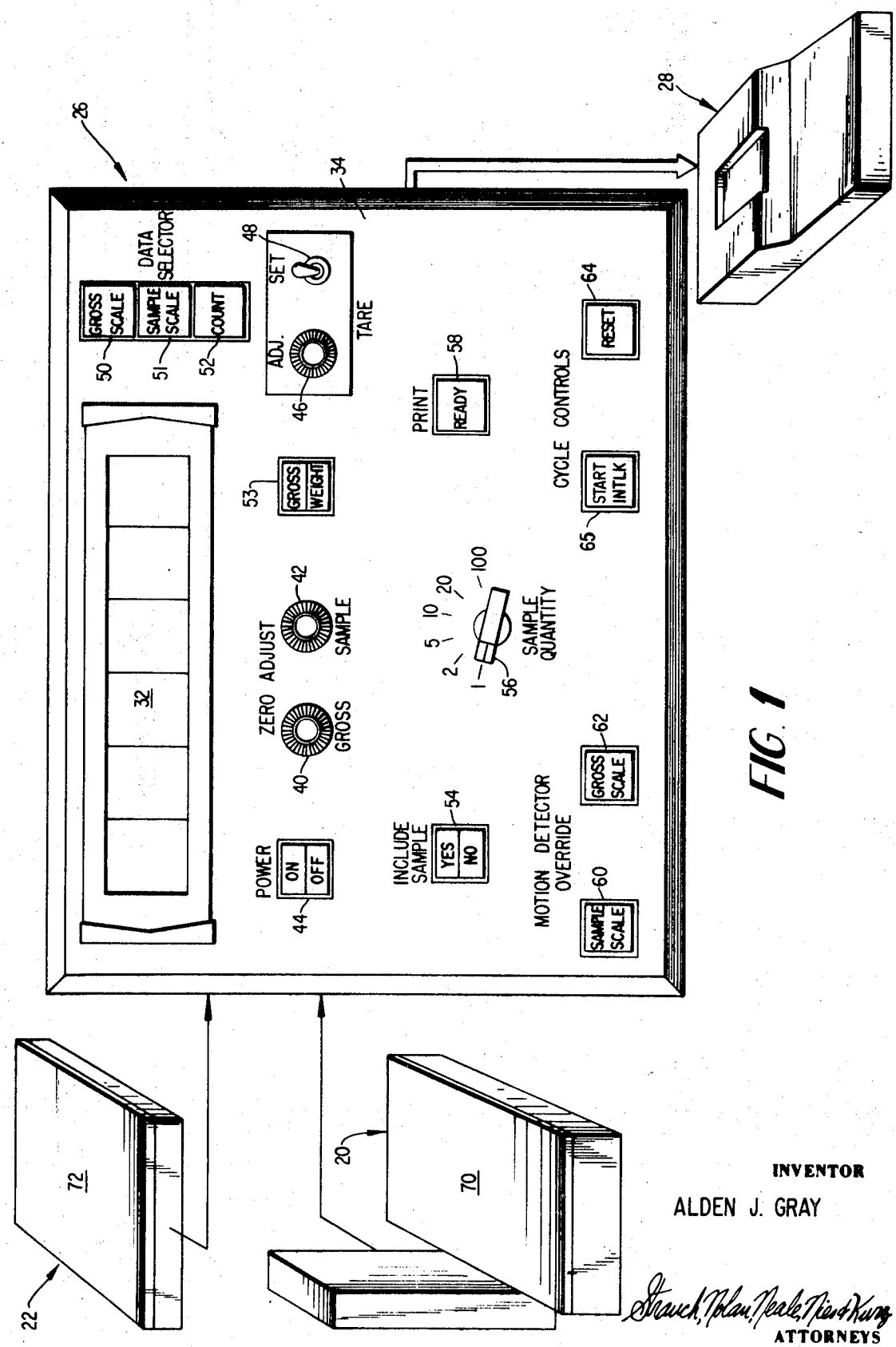
FIG. 1 is a partially diagrammatic view of a piece counting system incorporating the principles of this invention.
Figure 2:
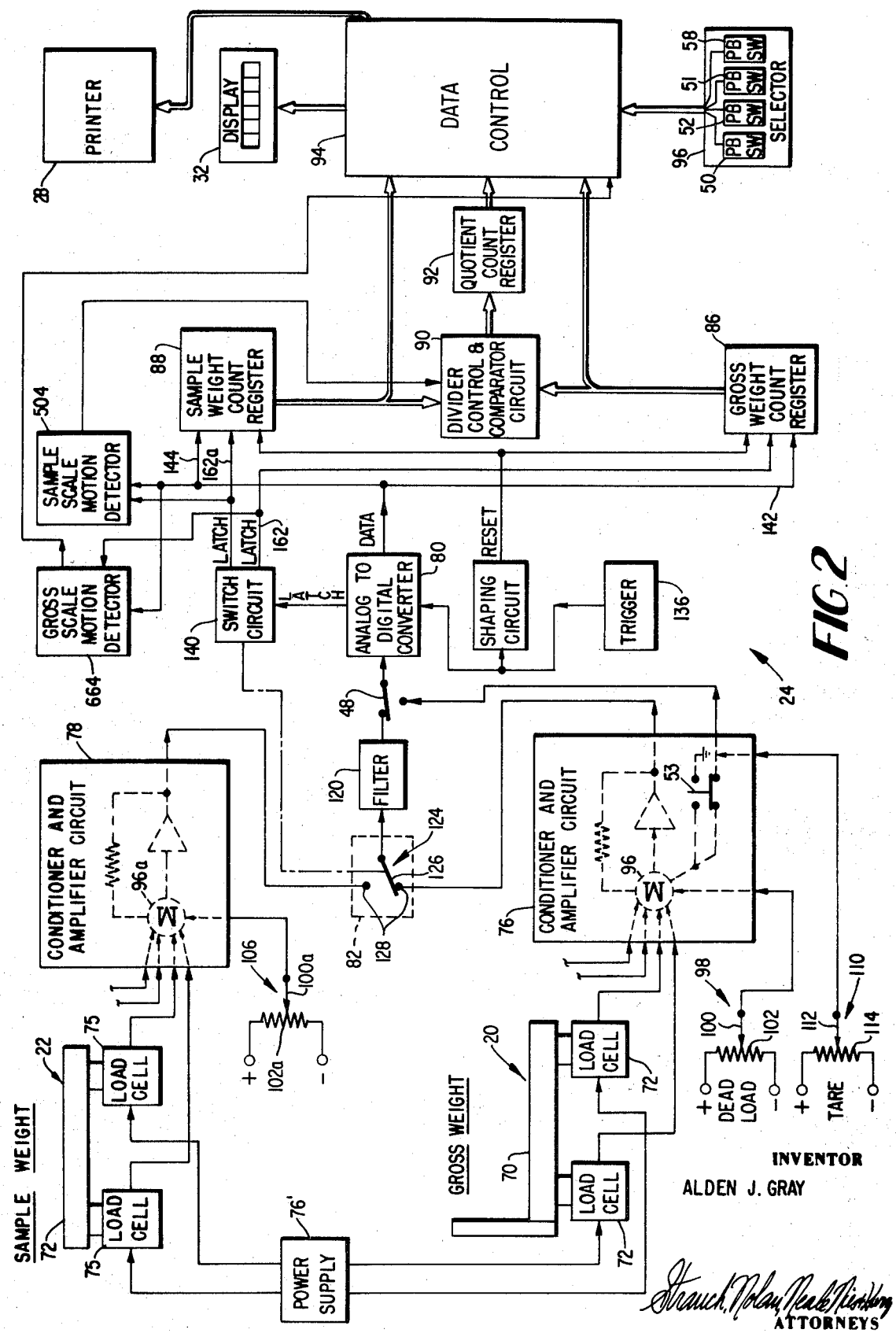
FIG. 2 is a circuit diagram of the control and computing circuit which is housed in the cabinet shown in FIG. 1.

Referring now to the drawings and more particularly to FIGS. 1 and 2 the counting system incorporating the principles of this invention basically comprises a gross weight scale 20, a sample weight scale 22, and a control and computing circuit 24 (FIG. 2) that may be housed in a cabinet 26. A printer 28 or other data collection system may also be included to provide a record of the read-out.

Briefly, the number of pieces or parts in a gross lot is calculated by placing a pre-selected number of the parts on sample scale 22 and by placing the gross lot of parts to be counted on gross scale 20. Control and computing circuit 24, when activated, is responsive to the respective weights of the sample and gross lots to provide a digital read-out of the number of parts in the gross lot on gross scale 20. Alternatively, circuit 24 may selectively be conditioned to provide a digital read-out of the total number of parts in both the gross lot and the sample lot on the gross and sample scales respectively. The read-out of the number of parts may be displayed by a visual digital translator and display device 32 (see FIG. 1) and optionally printed by printer 28.

Cabinet 26 has a control panel 34, and the controls on control panel 34 comprise a gross scale zero adjust knob 40, a sample scale zero adjust knob 42, a power on/off pushbutton switch 44, a tare adjust knob 46, a tare set switch 48, four data read-out pushbutton selector switches 50, 51, 52, and 53, a yes/no — include sample pushbutton selector switch 56, a print pushbutton switch 58, a sample scale motion detector override pushbutton switch 60, a gross scale motion detector override pushbutton switch 62, a reset pushbutton switch 64, and a start-interlock pushbutton switch 65.

Gross scale zero adjust knob 40 is selectively manipulatable to adjust for the dead load of gross scale 20 Sample scale zero adjust knob 42 is selectively manipulatable to adjust for the dead load of sample scale 22. Power switch 44 is selectively actuatable to turn the power on and off for selected components in the system. Data selector switches 50, 51, 52, and 53 are selectively actuatable to provide a read-out of the following data in digital form on display device 32:

Switch 50: The weight of the load on gross scale 20 less any tare weight as determined by the setting of tare adjust knob 46.

Switch 51: The total weight of the load placed on sample scale 22.

Switch 52: The piece count; i.e., the number of parts in the gross lot on gross scale 20 or the number of parts in both the gross and sample lots on scales 20 and 22, depending upon the setting of switch 54.

Switch 53: When actuated in conjunction with switch 50 the total weight on gross scale 20 will be displayed regardless of the tare setting on knob 46.

Switch 54 is utilized to program circuit 24 to either count in or not count in the number of pieces in the sample lot on the sample scale. Switch 56 is used to program into circuit 24 the number of pieces in the sample lot on the sample scale. In this embodiment the numbers that can be programmed into circuit 24 are 1, 2, 5, 10, 20 and 100.

With regard to switches 54 and 56, the pieces to be counted frequently are put in a tote bin or other form of container that is placed on gross scale 20. One type of operation requires that the operator remove the sample pieces from the tote bin to make up the sample lot that is placed on sample scale 22. If the pieces are to be returned to the tote bin after a counting operation, they must then be counted along with the pieces on gross scale 20. Under such conditions, the operator selects a number of pieces corresponding to the number that can be programed into circuit 24 by switch 56. For example, if five pieces are selected to make up the sample lot, switch 56 is turned to its position corresponding to the number five. In addition, switch 54 is actuated to program circuit 24 to include in the display or printed record of the piece count the number corresponding to the setting of switch 56 so that the count that is read out will be the sum of the pieces on gross scale 20 and sample scale 22 respectively.

In other operations it may not be desired to include the number of pieces on the sample scale in the readout count. For such operations, switch 54 is actuated to program circuit 24 not to count in the number of pieces corresponding to the setting on switch 56. For example, some operations require a series of tote bins to be successively filled, thus requiring a representative sample to be left on scale 22. Each tote bin is placed on scale 22 and is then filled until the display indicated by device 32 equals the number of desired pieces in a lot. In this instance, the sample pieces remain on sample scale 22 and are not included in the counted lot on gross scale 20.

Print switch 58 is actuated to activate printer 28 and to thereby start a print cycle to print out the data selected by operation of switches 50–53. Reset switch 64 is actuatable to re-start the counting cycle at any time. Start-interlock switch 65 is utilized to override a minimum weight interlock on sample scale 22. Normally, the counting system will be interlocked so that a count cycle will not start until a weight is placed on sample scale 22 as will be described in greater detail later on.

Switch 60 is actuatable to override a motion detection control that normally prevents a count cycle from starting if sample scale 22 has not stabilized. Actuation of switch 62 performs the same function as applied to gross scale 20.

Tare set knob 46 is utilized to set into circuit 24 the tare weight of a tote bin or other parts container on gross scale 20. The effect of this adjustment is to tare out the weight of the parts container. Preferably the tare control comprising knob 46 and switch 48 corresponds to that disclosed in FIG. 8A of pending application Serial No. 58,259 filed on July 27, 1970 for "Electrical Weighing Systems" and assigned to the same assignee of this application. With this type of tare adjustment, switch 48 may be actuated to display at device 32 the tare setting established by adjustment of knob 46.

Scales 20 and 22 are provided with suitable load-receiving structures such as platforms 70 and 72 respectively. Platform 70 may be supported by a series of four conventional load cells 72 (two shown) which are arranged one at each of the four corners of the platform. Platform 70 is arranged to receive the gross lot of pieces to be weighed or a container containing the gross lot of pieces to be weighed. Each of the load cells 74 may be of the conventional silicon or resistance strain gauge type and is excited by a suitable d.c. power supply source indicated at 76'. It will be appreciated that the algebraic summation of the load cell output signal voltages of load cells 74 will be proportional to the weight of platform 70 as well as weight of the load placed on platform 70. Alternatively, platform 70 may be supported on a suitable, unshown lever mechanism which, in turn, is connected to a single unshown load cell that produces a d.c. signal voltage which is proportional to the dead load of scale 20 and the weight of the load applied thereto.

Sample scale 22 also is provided with a transducer assembly for developing an electrical signal which is a function of the load applied to the sample scale platform 72. In this embodiment, the transducer assembly for scale 22 is the same as that described for scale 20, and the load cells (two shown) supporting platform 72 at the corners thereof are indicated at 75. Cells 75 are activated by a power supply source 76'. In place of load cells 75, platform 72 may be supported on a suitable unshown lever mechanism which, in turn, is connected to a single unshown load cell that produces a d.c. signal voltage which is proportional to the dead load of scale 22 and the weight of the load applied thereto. It also will be appreciated that transducers other than load cells may be utilized to provide electrical signals that are functions of the weights of the loads applied to scales 20 and 22.

As shown in FIG. 2, control and computer circuit 24 basically comprises a gross scale analog conditioner and amplifier circuit 76, a sample scale analog conditioner and amplifier circuit 78, an analog-to-digital converter 80, a gross weight count register 86, a sample weight count register 88, a divider control and comparator circuit 90, a quotient count register 92, a data selection control circuit 94, and a selector circuit 96 which incorporates pushbuttons 50–53.

Conditioner and amplifier circuit 76 is preferably the same as that shown and described in the previously identified application Ser. No. 58,259, the disclosure of which is hereby incorporated into this application by reference. Circuit 76 includes an operational amplifier having an input summing junction 96. The outputs of load cells 72 are connected through unshown summing resistors to summing junction 96 where they are algebraically summed.

Since the summed output signal voltage developed by the load cell assembly 20 is proportional to the weight of platform 70 as well as the weight of the load placed on platform 70, a dead weight tare adjustment is provided for by a potentiometer 98 having a movable wiper or arm 100 which is mechanically connected to knob 40 for adjustment along a resistor 102. Resistor 102 is connected across a suitable source of d.c. power as shown. The d.c. signal voltage impressed on wiper 100 is applied to summing junction 96. The dead weight potientiometer signal voltage will be opposite in sign to the like signs of the output signal voltages developed by load cells 72. Wiper 100 is adjusted to offset or tare out the weight of the scale parts acting on the load cell assembly to thereby provide a substantially zero signal voltage condition at the output of circuit 76 when no load is on platform 70. Thus, the amplified d.c. signal voltage supplied at the output of circuit 76 will be proportional to the load placed on platform 70.

Conditioner and amplifier circuit 78 is preferably the same as circuit 76, like reference numerals suffixed by the letter "a" being applied to designate the circuit components associated with circuit 78. As shown, the outputs of load cells 75 are connected through unshown summing resistors to summing junction 96a where they are algebraically summed.

As described in connection with scale 20, the d.c. output signal voltages developed by load cells 75 will be proportional to the load applied to platform 72 and also the weight of platform 72 and any other scale parts acting on the assembly of load cells 75. Scale 22 is therefore provided with a dead weight tare adjustment comprising a potientiometer 106 which is the same as the potientiometer 98; like reference numerals suffixed by the letter "a" being applied to designate like components in potientiometer 106.

The d.c. signal voltage impressed on wiper 100a is applied to summing junction 96a along with the signal voltages developed by load cells 75. Wiper 100a is mechanically connected to knob 42. The signal voltage applied by potientiometer 106 to summing junction 96a will be opposite in sign to the like signs of the signal voltages applied by load cells 75 to summing junction 96a. Wiper 100a is adjusted to offset or tare out the weight of scale parts acting on the assembly of load cells 75 to thereby provide a substantially zero signal voltage at the output of circuit 78. Thus, the d.c. signal voltage at the output of circuit 78 will be proportional to the weight of the load placed on platform 72 of sample scale 22.

With continued reference to FIG. 2, the tare adjustment associated with gross scale 20 comprises a potientiometer 110 having a wiper or arm 112 which is mechanically connected to knob 46 for adjustment along a resistor 114. Resistor 114 is connected across a suitable source of d.c. power as shown. The d.c. signal voltage on wiper 112 is applied through switch 53 to summing junction 96 with a polarity that is the same as that of the signal voltage supplied by potientiometer 98. Thus, by adjustment of potientiometer 110, the output signal voltage developed by circuit 76 may selectively be reduced by a magnitude corresponding to the weight of a tote bin or other parts container on platform 70. The output signal voltage developed by circuit 76 will therefore be proportional to the weight of pieces placed in a parts container on platform 70 of the gross scale 20.

As described in detail in the previously identified copending application Ser. No. 59,259, switch 53, when in its illustrated position, electrically connects wiper 112 to summing junction 96 with the result that the output signal developed by circuit 76 will be proportional to the weight of pieces in a container on platform 70. By selectively actuating switch 53 to its unillustrated position potientiometer 112 will be electrically disconnected from summing junction 96 to remove the tare signal voltage developed by potientiometer 110 from summing junction 96. As a result, the output signal voltage developed by circuit 76 will be the gross weight or, more particularly, the sum of the weights of the container and the parts in the container on platform 70.

With continued reference to FIG. 2, the amplified and conditioned signal voltages developed by circuits 76 and 78 are applied to input terminals of time sharing device 82. Time sharing device 82 is actuated to alternatively and periodically connect the outputs of circuits 76 and 78 to the input of a filter 120. In this embodiment, device 82 is schematically illustrated to comprise a switch or relay contact arrangement 124 having a switch element 126 which is alternatively engagable with the input terminals that are indicated at 128. When switch element 126 is actuated to its illustrated position, the output of circuit 76 is electrically connected to input of filter 120, and when switch element 126 is actuated to its unillustrated position, the output of circuit 78 will be electrically connected to the input of filter 120. Thus, in one position of switch element 126, the amplified and conditioned signal voltage developed by circuit 76 will be applied to the input of filter 120, and in the other position of switch element 126, the conditioned and amplified output signal voltage developed by circuit 78 will be applied to the input of filter 120. In practice, time sharing device 82 may comprise any suitable form of switching circuit for accomplishing the foregoing functions. Time sharing device 82 enables a single analog-to-digital converter (as indicated at 80) to be time shared between scales 20 and 22. Thus, converter 80 is utilized to convert the d.c. analog signal voltages of both circuit 76 and circuit 78.

The weight-representing, conditioned and amplified d.c. signal voltage at the output of time sharing device 82 is serially applied through filter 120 and switch 48 to the input of converter 80. Filter 120 is desirable of the low pass type having good transient response to a step input to develop a filtered d.c. output signal voltage that is substantially free of a.c. components that might interfere with accurate weight measurements.

When switch 48 is in its illustrated, unactuated position it electrically connects the output of filter 120 to the data input of converter 80, thus applying the amplified, conditioned and filtered weight-representing signal voltage to the input of converter 80 for conversion into a digital signal as will be described in greater detail shortly. When switch 48 is actuated to its unillustrated position, it electricall disconnects the data input of converter 80 from the output of filter 120 and electrically connects the input of converter 80 through an unshown amplifier network directly to wiper 112 of potientiometer 110. This unshown amplified network is described in detail in co-pending application Ser. No. 58,295. Thus, when switch 48 is actuated to its unillustrated position, the output digital signals developed by converter 80 will represent the selected setting of potientiometer 110.

With switch 48 in its illustrated position, the conditioned, amplified, load cell-developed signal voltage at the output of filter 120 is, as previously described, applied to the input of converter 80. Converter 80 may be this any suitable, appropriate form for producing a digital signal or representation that is a function of the voltage level of the d.c. signal voltage applied to its data input. In this embodiment, the digital signal is in the form of a recurrent pulse stream or train of constant repetition frequency (i.e., equal time separation between pulses). The number of pulses in each pulse train is proportional to the voltage level of the d.c. signal voltage applied to the input of converter 80 at a time when the analog input signal is sampled.

A sample rate trigger circuit 136 produces a recurrent trigger signal (such as a saw tooth signal voltage) of constant repetition rate which is applied to the analog-to-digital conversion network of converter 80. Trigger circuit 136 may be regarded as part of converter 80, and in response to each trigger signal, converter 80 samples the d.c. signal voltage applied to the input of converter 80. Converter 80 translates each sampled analog or d.c. signal into a series of pulses of equal time separation, and as mentioned above, the number of pulses in each series will be proportional to the voltage level of the signal applied to the input of the converter. The repetition rate of the trigger signal determines the rate at which the analog signal is sampled.

Converter 80 may be of the type described in the previously mentioned application Ser. No. 58,259 or it may particularly be of the dual ramp type described in co-pending application Ser. No. 58,260 filed on July 27, 1970 for "Electrical Weighing System" and assigned to the assignee of this application. The disclosure of U.S. application Ser. No. 58,260 is hereby incorporated into this specification by reference.

The digital data output pin of converter 80 is connected by lines 142 and 144 respectively to the data input pins of registers 86 and 88. Thus, the digital output of converter 80 is applied to both the gross weight count register 86 and the sample weight count register 88, but the supplied digital data will be memorized in only one or the other of the count registers under the control of a switching circuit 140 which also controls operation of the time-sharing switch element 126.

Figure 3:
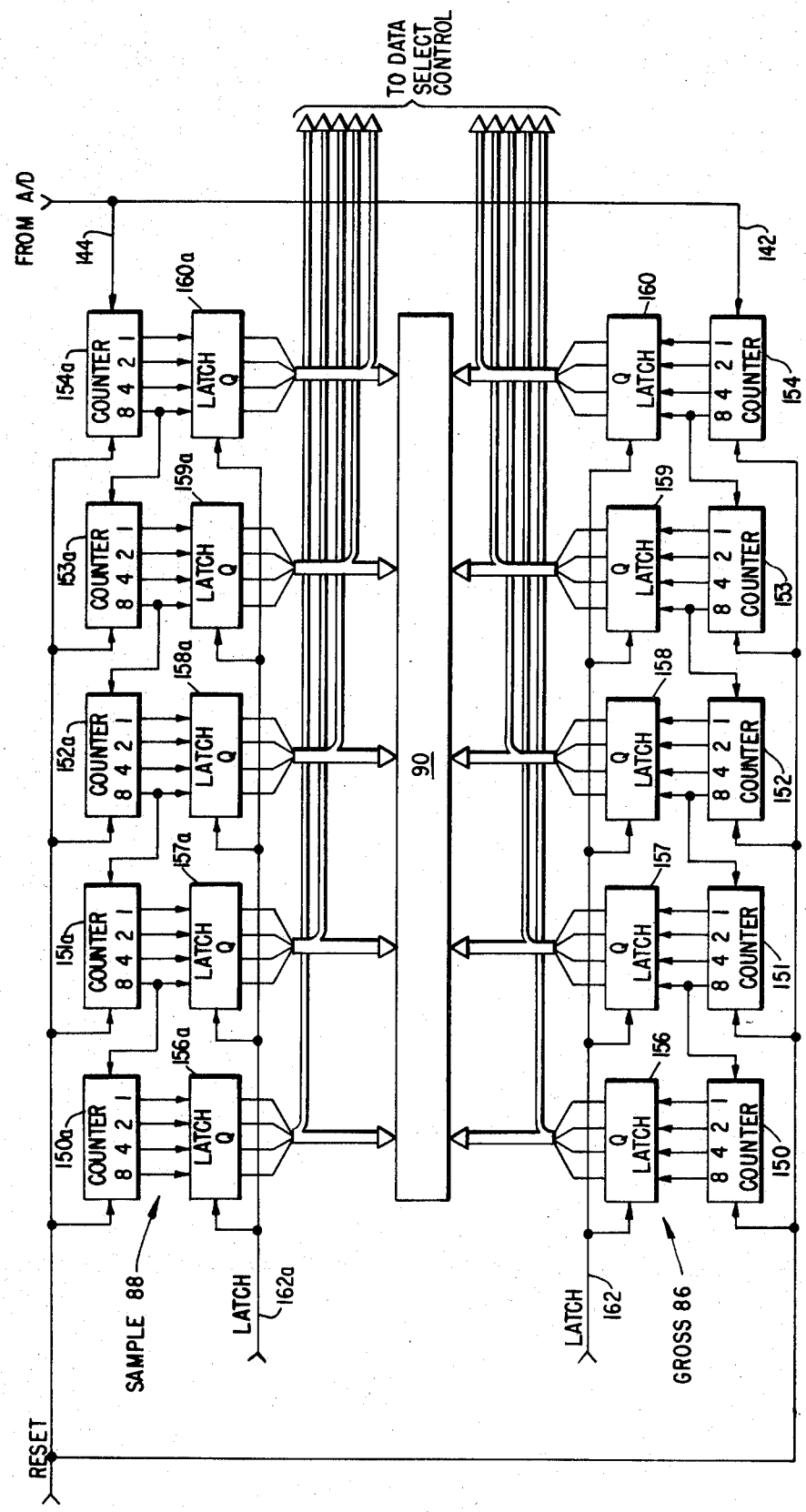
FIG. 3 is a circuit diagram of the gross and sample count registers illustrated in FIG. 2.

Referring now to FIG. 3, the gross weight count register comprises a multi-decade pulse counter with a BCD memory and is preferably the same as that disclosed in either application Ser. No. 58,259 or application Ser. No. 58,260. As shown, the counter circuit of register 86 comprises a series of conventional BCD electronic decade counter 150, 151, 152, 153 and 154 each having a four-bit, 8-4-2-1 BCD output. These outputs of counters 150-154 represent a multi-decimal number in which the order proceeds from the most significant digit at counter 150 to the least significant digit at counter 154. Counters 150-154 advantageously are of the monolithic type SN 7490.

Each of the counters 150-154 will automatically reset when a signal level at its "eight" pin changes from a high (a logical 1) to a low (a logical 0) at the tenth pulse. With the illustrated connections, counters 154, 153, 152 and 151 will transfer the count of 1 to the next suceeding counter for every ten counts coming into the counter.

As shown, the data output of converter 80 is connected by line 142 to the data input pin of counter 154 which represents the least significant digit. It will be appreciated that the number of counters employed in the counter circuit will depend upon the number of decades that are desired in the number to be displayed or printed.

Still referring to FIG. 3, the BCD memory in count register 86 is provided by a latch network comprising a series of BCD data word storage or memory latches 156, 157, 158, 159 and 160, one for each of the counters 150-154. Latches 156-160 advantageously are of the four-bit quad type SN 7475, each having four storage devices for storing a four-bit data word and the complement thereof. For this purpose each of the four storage devices in each latch have a Q and $\overline{Q}$ output. Each storage device also has a data input pin and a memory or latch pin. The data words to be stored in latches 156-160 are supplied by counters 150-154 respectively.

A latching signal line 162 connects one output of switching circuit 140 to the latch pins of each of the latches 156-160. At the end of each analog-to-digital conversion of the sampled load cell-developed signal from gross scale 20 — that is at the end of each pulse train providing a measure of the weight on gross scale 20 — converter 80 supplies a latching signal of the proper logical state to switching circuit 140. Whenever switching circuit 140 applies a converter-developed latch signal over line 162 to latches 156-160, whatever signal states that are present on the data input pins of latches 156-160 will be transferred to and stored on the Q output pins of the latches, and the complements thereof will be stored on the $\overline{Q}$ output pins of the latches. Old data information on the output pins of latches 156-160 will automatically be removed upon the transfer of the new information to the latch output pins.

As shown, the outputs of counter 150-154 are connected in parallel to latches 156-160 respectively. The data information in counters 150-154 is therefore transferred in parallel to latches 156-160 respectively. Latches 156-160 memorize or store this information when the proper latching logical state is supplied to line 162 as describe above.

Still referring to FIG. 3, the circuit for the sample weight count register 88 is the same as that just described for count register 86. Accordingly, like reference numerals suffixed by the letter "a" have been applied to designate like components in sample count register 88. Another latch signal output of switching circuit 140 is connected by a line 162a to the latch pins of each of the latches 156a-160a. Whenever switching circuit 140 applies a converter-produced latch signal over line 162a to latches 156a-160a, the data words at the input pins of latches 156a-160a will be transferred to and stored at the output pins of the latches.

The Q output pins of latches 156-160 are connected in parallel to circuit 90, and the Q output pins of latches 156a-160a also are connected in parallel to circuit 90 for a purpose to be described in detail later on. The Q output pins of latches 156-160 and the Q output pins of latches 156a-160a also are connected in parallel to data select control circuit 94 to enable the weight information stored in count registers 86 and 88 to be separately read out in visual or printed form by actuation of switches 50 and 51.

To reset counter 150-154 and 150a-154a, the trigger pulse from trigger circuit 136 may be applied through a shaping circuit simultaneously to the reset pins of the counters.

Figure 4:
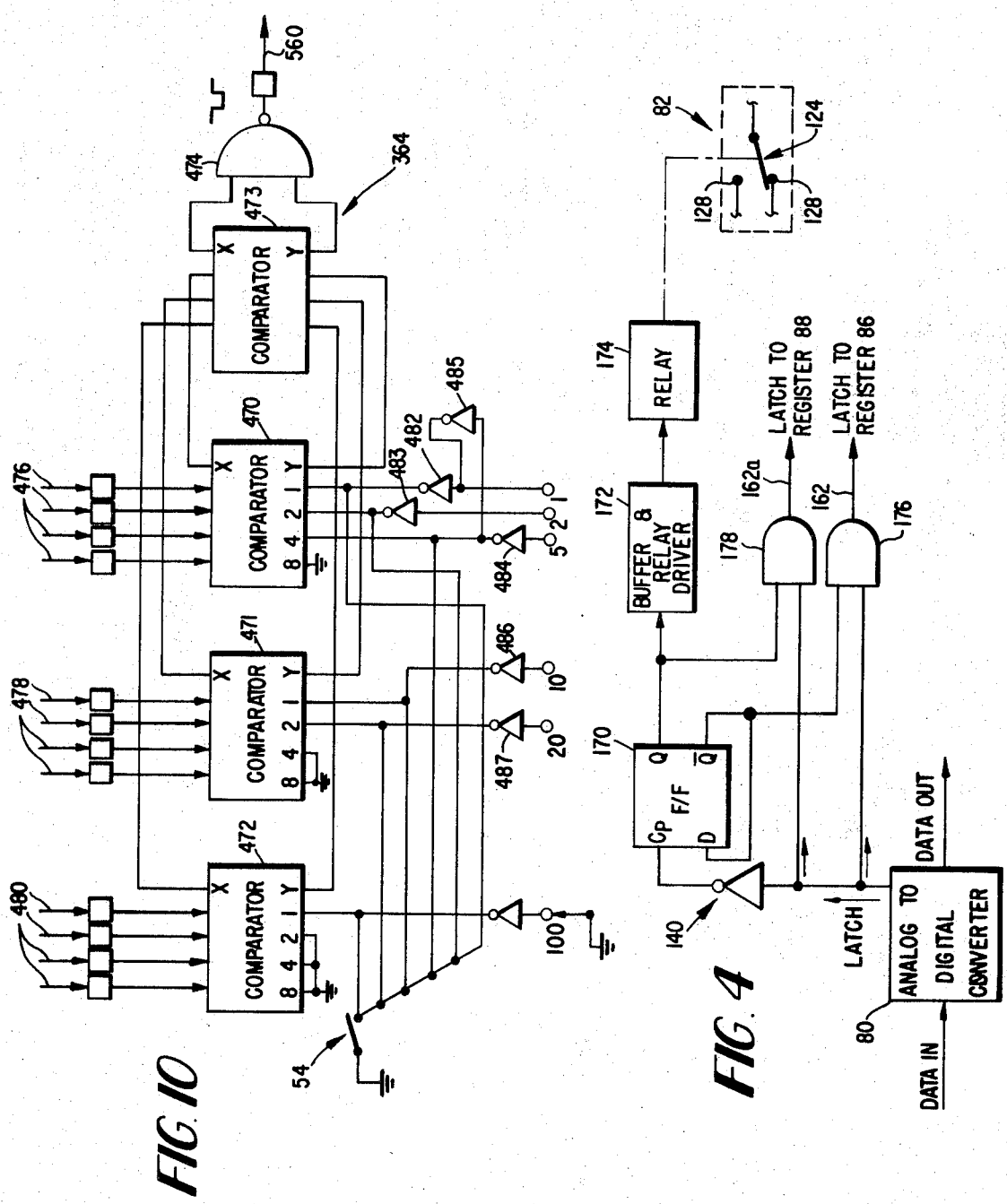
FIG. 4 is a circuit diagram of the time sharing switching circuit shown in FIG. 2.

Referring now to FIG. 4, switching circuit 140 correlates the application of latch signals to lines 162 and 162a with the operation of switch element 126. As shown, circuit 140 comprises a flip flop 170, a buffer and relay driver 172, a relay 174 for operating element 126, and a pair of AND gates 176 and 178. Converter 80 has a latch signal supply pin which is connected to one input of gate 176, to one input of gate 178, and through an inverter to the CP input pin of flip flop 170. The Q output of flip flop 170 is connected to the input of relay driver 172 and to the other input of gate 178. The $\overline{Q}$ output pin of flip flop 170 is connected to the other input of gate 176. The output of gates 176 and 178 are respectively connected to lines 162 and 162a. The output of AND gate 176 is therefore connected to supply a latching signal to latches 156–160, and the output of gate 178 is connected to supply a latching signal to latches 156a–160a.

Converter 80 is of the type that will supply a latching pulse at its latch supply pin after each conversion or, more particularly, after each weight-representing pulse train is developed and supplied at the output of the converter. Each of the converter-produced latch pulses is applied to AND gates 176 and 178, and each latch pulse is inverted and the inversion is applied to the CP pin of flip flop 170 which is advantageously of the SN 7474 type. With the circuit connections shown for this type of flip flop, the logical state on the Q and $\overline{Q}$ output pins of flip flop 170 will be reversed on the trailing edge of the inverted latch pulse that is applied to the CP input pin.

Switch element 126 will be actuated to its illustrated gross weight position by relay 174 when the signal condition on the Q output pin of flip flop 170 is low or a logical 0. Thus, gate 178 will be disabled. Gate 176 will be enabled by the logical 1 on the $\overline{Q}$ output pin of flip flop 170 so that when converter 80 applies the next latching pulse it will be applied through gate 176 to line 162 and from line 162 to latches 156–160. Upon receiving the trailing edge of the conversion of this converter-produced latching pulse, flip flop 170 will be toggled to place a logical 1 on its Q output pin and a logical 0 on its $\overline{Q}$ output pin. Gate 176 will now be disabled, but only after the latching pulse has been applied to line 162. In addition, gate 178 will be enabled, and in response to the logical 1 at the Q output pin of flip flop 170, relay 174 will actuate switch element 126 to its unillustrated sample weight position where it connects circuit 78 to the data input converter 80.

The next converter-produced latching pulse will now be applied through gate 178 to line 162a and from there to latches 156a–160a. The trailing edge of the inversion of this latching pulse will switch the output logical states of flip flop 170 to place a logical 0 on the Q output pin and a logical 1 on the $\overline{Q}$ output pin.

It will be observed that trigger circuit 136 will supply a trigger pulse shortly after each converter-produced latching pulse, and this trigger pulse will reset all of the counters 150–154 and 150a–154a as well as causing converter 80 to sample the analog signal at its data input.

In operation of the counting system thus far described, power is applied to activate the system by selectively actuating switch 44. Upon being activated, circuit 76 will supply an analog signal voltage that is proportional to the weight of the pieces in the gross lot on gross scale 20, and circuit 78 will develop an output analog signal voltage that is proportional to the piece or pieces in the sample lot on sample scale 22. These sample and gross signal voltages are applied concomitantly to the input terminals of time sharing device 82, and they will alternately be applied to the input of converter 80 under the control of switching circuit 140.

Assume that the preceding latch pulse converter-produced latch pulse caused switching circuit 140 to actuate switch element 126 to its illustrated position where it electrically connects the output of circuit 78 through filter 120 to the data input of converter 80. Thus, in response to the next trigger signal supplied by trigger circuit 136, counters 150–154 and 150a–154a will be reset to zero. In addition, converter 80 will sample the voltage representing the weight of the pieces on gross scale 20 and will convert the sampled signal voltage into a pulse train in which the number of pulses is proportional to the level of the sampled signal voltage and consequently to the weight of the pieces in the gross lot on gross scale 20. This gross weight pulse train is supplied to both count registers 86 and 88, and hence the number of pulses in the train will be counted in by both sets of counters in registers 86 and 88.

The pulse count loaded into the set of counters 150–154 and into the set of counters 150a–154a will both be representative of the weight of the pieces on gross scale 20. Hence the BCD data information supplied by counters 150–154 to the data input pins of latches 156–160 will represent the weight of the pieces on gross scale 20. In addition, the same BCD data information will also be supplied by counters 150a–154a to the data input pins of latches 156a–160a.

At the end of the generation of the gross weight pulse train and before the next trigger signal from trigger circuit 136, converter 80 will supply a latch pulse to switching circuit 140. This latch pulse will be applied to line 162, but not to line 162a, since gates 176 and 178 are, at this stage, respectively enabled and disabled. As a result, only latches 150–154 will be activated to transfer the BCD data information at their data input pins and to store the transferred information at their data output pins.

The trailing edge of the same latch pulse that caused latches 156–160 to store the BCD data information supplied by counters 150–154, also causes switching circuit 140 to activate switch element 126 to its unillustrated position where it electrically connects circuit 78 to the data input of converter 80 in place of circuit 76.

Thus, in response to the next trigger signal from trigger circuit 136, counters 150–154 and 150a–154a will again be reset to zero, and converter 80 will sample the sample weight signal voltage at its input to supply another pulse train in which the number of pulses now are proportional to the piece or pieces in the sample lot on sample scale 22. By resetting counters 150–154 and 150a–154a to zero, the gross weight data information in both sets of counters is removed, but the gross weight information will remain stored on the output pins of latches 156–160.

Both sets of counters 150–154 and 150a–154a will now count in the number of pulses in the sample weight pulse train, and at the end of the sample weight pulse train and before the next trigger signal, converter 80 supplies another latch pulse to switching circuit 140. This latch pulse will be applied to line 162a, but not to line 162 since gates 178 and 176 are now respectively enabled and disabled.

Therefore, latches 156a–160a — but not latches 156–160 — will be activated to transfer the same weight BCD data information from its input pins to its output pins and to store the transferred information at its output pins. At this stage, therefore, the weight of the pieces on gross scale 20 will be stored in BCD form on the output pins of latches 156–160, and the weight of the piece or pieces in the sample lot on sample scale 22 will be stored in BCD form on the output pins of latches 156a–160a. In addition, the trailing edge of the last of the above mentioned converter-produced latch pulses will cause switching circuit 140 to actuate switch element 126 to its illustrated position where it connects circuit 76 to converter 80 in place of circuit 78.

The foregoing cycle is continually repeated as long as the system is activated so that the BCD data information on the output pins of latches 156–160 and 156a–160a will continually be up-dated. Thus, the gross weight analog signal and the sample weight analog signal are alternately and periodically sampled, converted into digital signals and stored on the latch output pins of counter registers 86 and 88 respectively.

With the gross weight information stored on the output pins of latches 156–160, switch 50 may be actuated to digitally display the weight of the pieces in the gross lot on display device 32. Likewise, with the sample weight information stored on the output pins of latches 156a–160a, switch 51 may be actuated to cause device 32 to display the weight of the piece or pieces in the sample lot on the sample scale.

If it is desired to read out the total weight (i.e., the sum of the weights of the container and the pieces) on gross scale 20, switches 50 and 53 are both actuated. By actuating switch 53, the signal voltage developed by potentiometer 110 is removed from summing junction 96, and the signal voltage developed by circuit 76 will therefore become proportional to the sum of the weights of the container on scale 20 and the parts in the container. Thus, the BCD data information transferred to and stored on the output pins of latches 156–160 will become equivalent to the gross weight of the container and pieces on scale 20, and this data will then be decoded and displayed by device 32 upon actuation of switch 50.

If it is desired to display the tare setting of potentiometer 110, switch 48 is actuated to apply the signal voltage on wiper 112 to the input of converter 80 in place of the output signal voltage from filter 120. The potentiometer developed signal voltage will therefore be sampled, digitized, counted in, and finally stored on the output pins of latches 156–160 as well as latches 156a–160a in the same manner as described for the sample weight and gross weight signals. Thus, when switch 50 is actuated the number displayed by device 32 will be the setting of potentiometer 110 in terms of units of weight. It also will be appreciated that any of the numbers displayed by device 32 may be printed out by printer 28 to provide a printed record by providing in control 94 suitable switching elements or logic under the control of switch 58.

Figure 5:
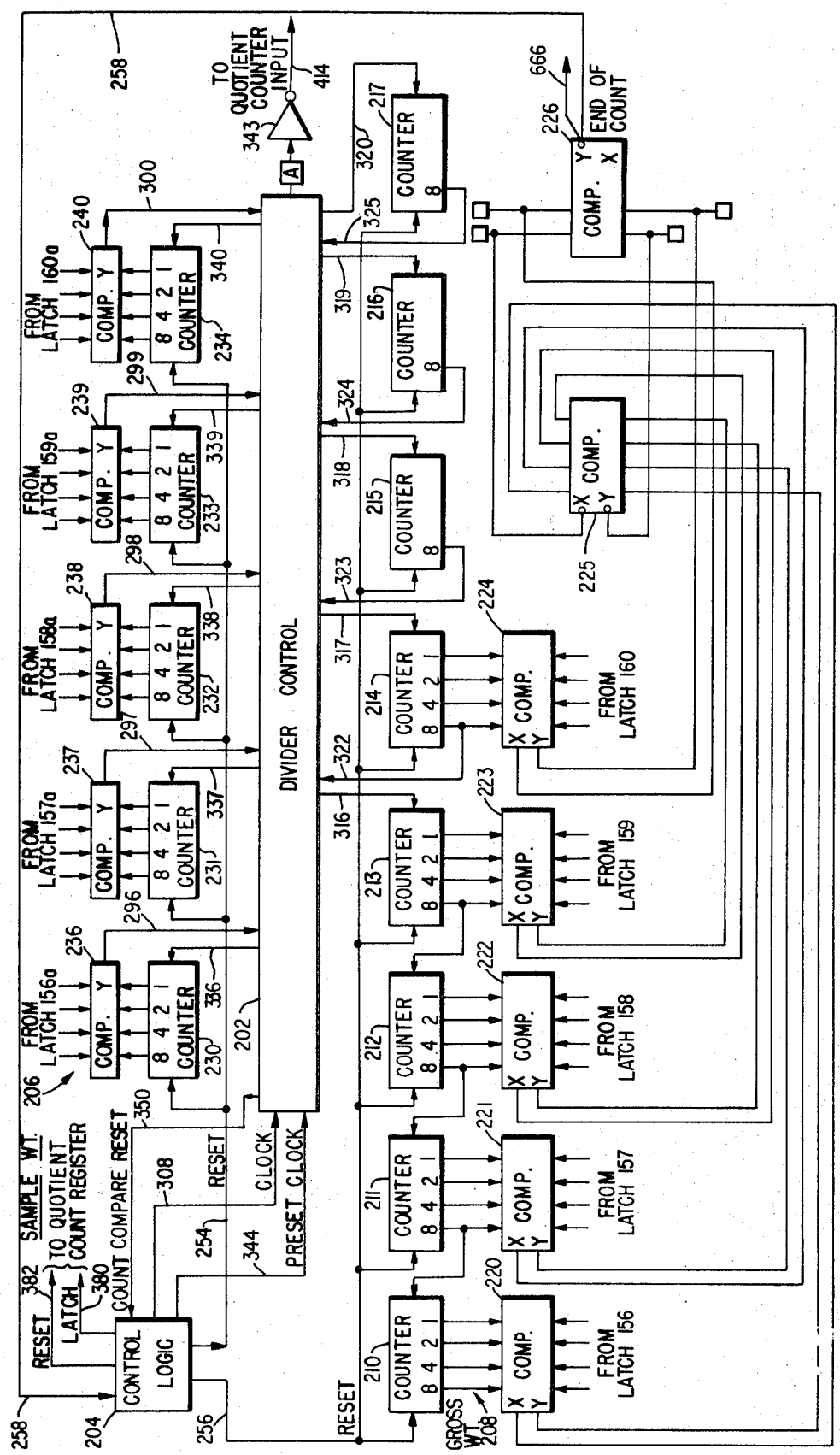
FIG. 5 is a circuit diagram of the divider control and comparing circuit shown in FIG. 2.

Referring to FIG. 5, circuit 90 comprises a divider-comparator circuit 200, a divider control circuit 202, and a control logic circuit 204. Comparator circuit 200 includes a sample weight count-comparator network 206 and a gross weight count-comparator network 208.

Gross weight network 208 comprises a series of BCD decade counters 210, 211, 213, 214, 215, 216 and 217 and a series of a BCD comparators 220, 221, 222, 223, 224, 225, and 226. Sample weight network 206 comprises a series of BCD comparators 236, 237, 238, 239 and 240.

As will be explained in detail shortly, circuit 90 effectively performs a dividing function to supply a train of pulses in which the number is proportional to the weight of pieces in the gross lot on scale 20 divided by the weight of the piece or pieces on sample scale 22. In brief, this is accomplished as follows: Divider control circuit 202 sequentially gates a clock pulse train from control logic circuit 204 to the counter for each decade in network 206. Simultaneously, the clock pulses are fed to corresponding counters in network 208 to be summed up to the gross weight stored on the output pins of latches 156–160. In response to control pulses from sample-count network 206, divider control circuit 202, shifts the clock pulse train from one decade to the next starting with the most significant digit in the sample weight. The clock pulses supplied through divider control circuit 202 are counted and continuously compared with the latched weight information in networks 206 and 208. The comparison with the sample weight information supplied by latches 156a–160a is done decade by decade, starting with the most significant digit as mentioned above. The comparators in network 206 each supply one of the control signals to circuit 202 to shift the clock pulses to the counter representing the next least or lower digit. The comparison with the gross weight information supplied by latches 156–160 is done at network 208 by comparing the counted clock pulses with the gross weight information, and when the comparison indicates that the total number of counted in clock pulses becomes equal or greater than the gross weight data supplied by latches 156–160, network 208 supplies an end-of-count signal which terminates the counting operation and consequently the application of piece count-representing pulses to quotient count register 92.

As shown in FIG. 5, comparators 220–224 and 236–240 may be of the DM 8200 type for comparing two four-bit BCD data words. Counters 210–217 and 230–234 may be of the SN 7490 type.

Still referring to FIG. 5, the four data outputs of latch 156a are connected in parallel to one input comparison side of comparator 236. The four data outputs of counter 230 are connected in parallel to the other input comparison side of comparator 236. The four data outputs of latch 157a are connected to one input side of comparator 237, and the four data outputs of counter 231 are connected in parallel to the other input side of comparator 237. The four data outputs of latch 158a are connected in parallel to one input side of comparator 238, and the four data outputs of counter 232 are connected in parallel to the other input side of comparator 238. The four data outputs of latch 159a are connected in parallel to one input side of comparator 239, and the four data outputs of counter 233 are connected in parallel to the other input side of comparator 239. The four data outputs of latch 160a are connected in parallel to one input side of comparator 240, and the four data outputs of counter 234 are connected in parallel to the other input side of comparator 240. The four data outputs of latch 156 are connected in parallel to one input side of comparator 220, and the four data outputs of counter 210 are connected in parallel to the other input side of comparator 220. The four data outputs of latch 157 are connected in parallel to one input side of comparator 221, and the four data outputs of counter 211 are connected in parallel to the other input side of comparator 221. The four data outputs of latch 158 are connected in parallel to one input side of comparator 222, and the four data outputs of counter 212 are connected in parallel to the other input side of comparator 222. The four data outputs of latch 159 are connected in parallel to one input side of comparator 223, and the four data outputs of counter 213 are connected in parallel to the other input side of comparator 223. The four data outputs of latch 160 are connected in parallel to one input side of comparator 224, and the four data outputs of counter 214 are connected in parallel to the other input side of comparator 224.

Thus, it is clear that comparator 236 compares the two four-bit data words respectively supplied by latch 156a and counter 230, that comparator 237 compares the two four-bit data words respectively supplied by latch 157a and counter 231, that comparator 238 compares the two four-bit data words respectively supplied by latch 158a and counter 232, that comparator 239 compares the two four-bit data words respectively supplied by latch 159a and counter 233, that comparator 240 compares the two four-bit data words respectively supplied by latch 160a and counter 234, that comparator 220 compares the two four-bit data words respectively supplied by latch 156 and counter 210, that comparator 221 compares the two four-bit data words respectively supplied by latch 157 and counter 211, that comparator 222 compares the two four-bit data words respectively supplied by latch 158 and counter 212, that comparator 223 compares the two four-bit data words respectively supplied by latch 159 and counter 213, and that comparator 224 compares the two four-bit data words respectively supplied by latch 160 and counter 214.

Each of the comparators 220–224 and 236–240 has a Y output pin and X output pin. When the data word supplied by the associated latch is greater than the data word supplied by the associated one of counters 220–224 and 230–234 the signal at the comparator X output pin will be high or a logical 1, and the signal at the comparator Y output pin will be low or a logical 0. When a sufficient number of pulses are counted into the associated counter so that the data word supplied by the associated one of counters 210–214 and 230–234 equals the data word supplied by the associated latch, then the signals at both of the comparator X and Y output pins will be high or a logical 1. When the data word supplied by the associated one of counters 210–214 and 230–234 becomes greater than the data word supplied by the associated latch, then the signal at the comparator Y output pin will be high or a logical 1 and the signal at the comparator X output pin will be a low or a logical 0.

The purpose of counters 215–217, as will be described in greater detail shortly, relates to the different capacities of scales 20 and 22. In practice, the capacity of gross scale 20 is normally considerably greater than that of sample scale 22. For example, sample scale 22 may have a capacity of 20 pounds, and gross scale 20 may have a capacity of 10,000 pounds. With the circuit of this embodiment a five decade decimal number in units of weight is read out for both of the scales 20 and 22. Thus, the most significant digit in the read-out for gross scale 20 will be in the ten-thousands decade, while the most significant digit in the read-out for sample scale 22 will be in the tens decade. Thus, counters 215–217 are utilized to extend the counter decades in network 208 to correspond with the lowest decade in network 206 and to provide the necessary means for counting into network 208 all of the clock pulses counted by network 206.

Counters 215–217 thus count in the number of pulses that are counted in by counters 232–234, and counters 232–234 are utilized in the comparison of the tenths, hundredths, and thousandths decades of the five decade sample weight number. Counters 210–217 are connected to form an eight decade counter. With the illustrated connections, each of the counters 217, 216, 215, 214, 213, 212, and 211 will transfer the count of 1 to the next sueceeding counter of higher order (that is, respectively to counters 216, 215, 214, 213, 212, 211 and 210) for every ten counts or pulses coming into the counter. The transfer of the carry counts from counters 217, 216, 215 and 214 to counters 216, 215, 214 and 213 respectively is through gates in divider control circuit 202. Comparison of the number of pulses counted in by counters 215–217 is not required since the comparison of data words starts with the highest order decade in the sample weight number as will be described in detail shortly.

Initially all of the counters in networks 206 and 208 will be reset to zero by signals supplied by control logic circuit 204. When various input signal conditions are satisfied at control logic circuit 204, including the storage of the gross weight data information at the outputs of latches 156–160 and the storage of the sample weight information at the outputs of latches 156a–160 a, a clock pulse train of constant repetition frequency is supplied by logic circuit 204 to an input of divider control circuit 202. Divider control circuit first scans the signal condition at the Y output terminal of comparator 236. Since all of the counters in networks 206 and 208 were reset to zero at the start of the counting and comparison operation, the signal state at the Y output pin of comparator 230 will be low if the data word supplied by latch 156a is greater than zero. This low signal condition at the Y output terminal of comparator 236 conditions divider control circuit to apply the pulses in the clock pulse train simultaneously to counters 213 and 230. As previously mentioned, counter 230 corresponds to the highest order digit in the sample weight number, which for the previously given example, is the tens decade. The number in counter 213 corresponds to the tens decade in the gross weight number.

Upon application of the clock pulse train, counters 213 and 230 will simultaneously count in the clock pulses until comparator 236 detects coincidence or equality between the two data words that are respectively supplied by counter 230 and latch 156a. When these two data words become equal, the signal state at the Y output pin of comparator 236 will change from a low to a high or a logical 1.

Divider control circuit 202 is responsive to this logical state at the Y output pin of comparator 236 to disable the supply of clock pulses to counters 213 and 230. As a result, the count-in of pulses by counters 213 and 230 will be stopped, and the data word stored in counters 213 and 230 will be equal to that at the output of latch 156a.

If the data word supplied by latch 156a is zero instead of a number greater than zero, the signal state at the Y output pin of comparator 236 will be high or a logical 1 upon application of the data word and the initial resetting of all of the counters in networks 206 and 208. Thus, upon scanning the condition of the signal state at the Y output pin of comparator 236, divider control circuit 202 will be conditioned to block the application of clock pulses to counters 213 and 230.

In response to a logical 1 state at the Y output pin of comparator 236, divider control circuit 202 also shifts the clock pulse train to the next least significant or lower digit represented by counters 214 and 231 and is responsive to the signal state at the Y output pin of comparator 231 to either apply clock pulses simultaneously to counters 214 and 231 or block the application of clock pulses to counters 214 and 231. If the data word supplied by latch 157a is greater than zero the signal state at the Y output pin of comparator 237 will be low to thereby condition control circuit 202 to apply clock pulses simultaneously to counters 214 and 231. Counters 214 and 231 will count in the clock pulse until comparator 237 detects that the data word in counter 231 has become equal to the data word supplied by latch 157a. When this condition of coincidence occurs, the signal state at the Y output pin of comparator goes high to condition control circuit 202 to block the application of the clock pulses to counters 214 and 231 and to down shift the clock pulse train to the next pair of counters 215 and 232. At this stage, therefore, the data word stored in counters 214 and 231 will be equal to the data word supplied by latch 157a.

If, on the other hand, the data word supplied by latch 157a equals zero, the initial logical 1 state on the Y output pin of comparator 237 conditions control circuit 202 to block the application of any clock pulses to counters 215 and 232.

Upon down shifting from counters 214 and 231, divider control circuit 202 responds to the signal state at the Y output pin of comparator 238 in the same manner as previously described to either apply clock pulses simultaneously to counters 215 and 232 (if the signal state at the Y output pin is low) for simultaneous count-in by counters 215 and 232 or block the application of clock pulses to counters 215 and 232 (if the signal state at the Y output pin is already high). As a result, the data word stored in counters 215 and 232 will be equal to the data word supplied by latch 159a. When the condition at comparator 238 is satisfied, control circuit 202 down shifts the clock pulse train to the next lower order represented by counters 233 and 216 where the same process is repeated. As a result of this operation, the data words stored in counters 216 and 233 will be equal to the data word supplied by latch 159a, and control circuit 202 will shift the clock pulses to the last decade.

In the last stage, divider control circuit 202 responds to the signal state at the Y output pin of comparator 240 in the same manner as described above to either apply clock pulses simultaneously to counters 217 and 234 for count in or to block the application of clock pulses to counters 217 and 234. At the end of this phase, therefore, the data word in counters 217 and 234 will be equal to the data word supplied by latch 160a.

When control circuit 202 has down shifted to counters 217 and 234 and logical 1 states are present on the Y output pins of comparators 236-240, one counting and comparing cycle will have been completed, and divider control circuit 202 will now be conditioned to apply a pulse through pin A to quotient register 92 and to condition logic circuit 204 to supply a reset pulse over a line 254 to reset counters 230-234 zero. If the data word in counters 210-214 is not equal to or greater than the data stored in latches 156-160, logic circuit 204, will be conditioned so that no reset pulse is supplied over a line 256 to reset counters 210-217. The data words in counters 210-217 are therefore retained, and the count and compare cycle will be repeated in the same manner as described above, with divider control circuit 202 successively responding to the signal states at the Y output pins of comparators 236-240. During this second count cycle it will be appreciated that the number of pulses counted in by any one or more of the counters 213-217 may equal or exceed the count of 10, in which case that counter will transfer the count of 1 to the next higher order counter in the decade of counters.

The foregoing count cycle is continuously repeated until comparators 220-224 detect that the number represented by the data word in counters 210-214 is equal to or greater than the number represented by the data word stored on the output pins of latches 156-160. Until this condition occurs the count cycle repeats itself, and at the end of each cycle control circuit 202 supplies a pulse to quotient register 92, and counters 230-234, but not counters 210-217, will be reset to zero.

During the foregoing count cycles, comparators 220-224 are continuously comparing the data word in counters 210-214 with the data word stored on the outputs of latches 156-160 respectively. The signal output states at the Y and X output pins are applied for continuous comparison to comparators 225 and 226. Comparators 225 and 226 are interconnected to enable a comparison of two five-bit data words, to thereby correspond to the number of decades in the multi digit gross weight number that is represented by the data word stored in the five latches 156-160. The signal states on the X output pins of comparators 220-224 are applied in parallel to one input side of the combined comparators 225 and 226, and the signal states on the Y output pins of comparators 220-224 are applied in parallel to the other input side of the combined comparators 225 and 226.

Until the number represented by the data word in counters 210-214 becomes equal to or greater than the number represented by the data word stored on the outputs of latches 156-160, the signal state on the Y output pin of comparator 226 will be low or a logical 0. However, when the number represented by the data word in counters 210-214 becomes equal to or greater than the number represented by the data word stored in the outputs of latches 156-160, the signal state at the Y output pin of comparator 226 will become high or a logical 1.

The Y output pin of comparator 226 is connected by a line 258 to logic circuit 204, and logic circuit 204, as will be described in detail later on, is responsive to a logical 1 at the Y output pin of comparator 226 to disable or block the transmittal of the clock pulse train to divider control circuit 202, thus terminating the count-compare operation of circuit 200. At this time, the number of pulses supplied by divider control circuit 202 to quotient register 92 will be proportional, substantially, to the quotient of the total weight of pieces in the gross lot on scale 20 divided by the total weight of the sample piece or pieces in the sample lot on scale 22.

Figure 6:
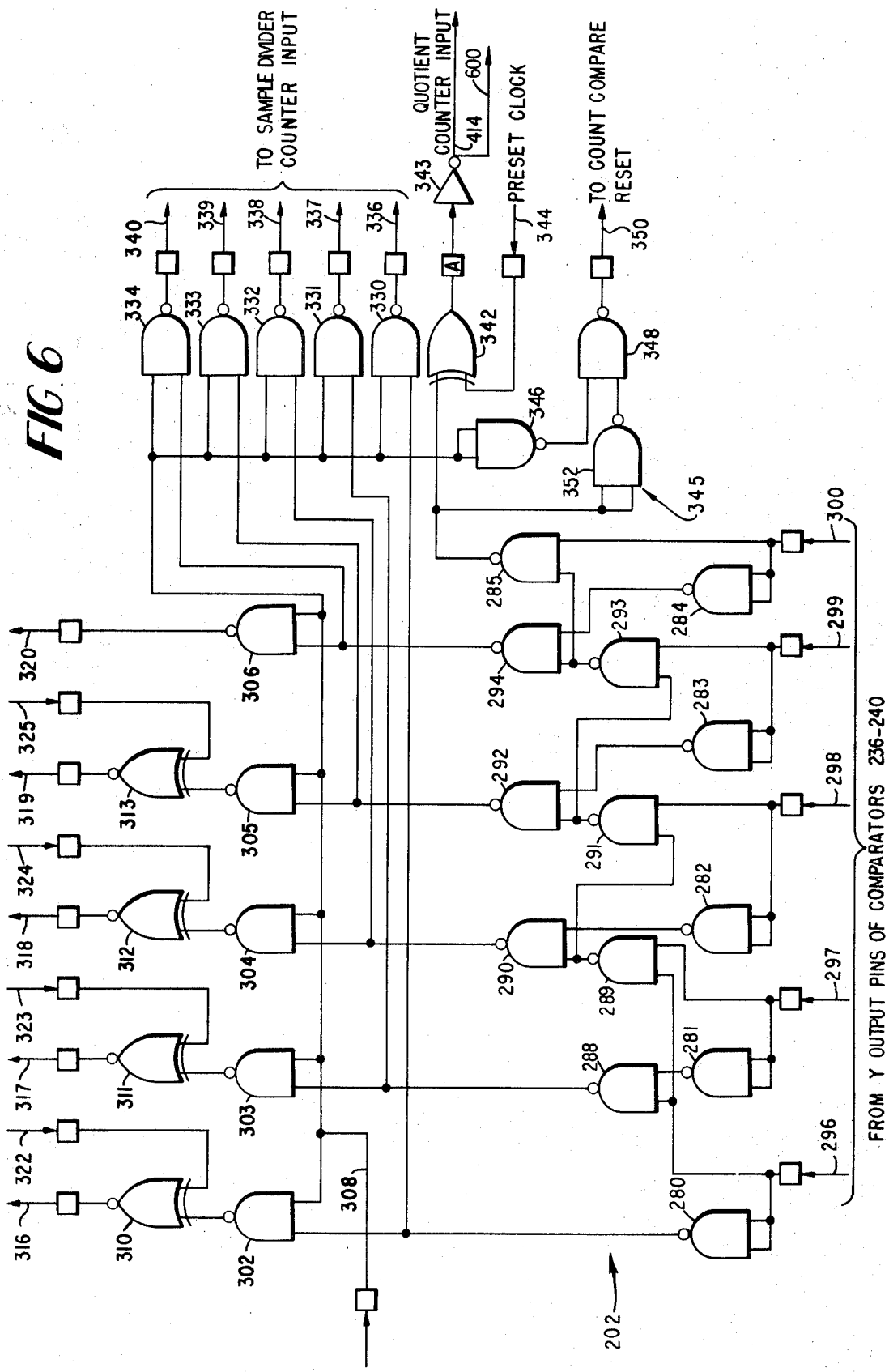
FIG. 6 is a circuit diagram of the divider control circuit shown in FIG. 5.

Referring to FIGS. 5 and 6, divider control circuit 202 comprises a ladder network made up of a series of NAND gates 280, 281, 282, 283, 284, and 285 and a series of AND gates 288, 289, 290, 291, 292, 293, and 294. The Y output pin of comparator 236 is connected by a line 296 to both inputs of gate 280, to one input of gate 288, and to one input of gate 289. The Y output pin of comparator 237 is connected by a line 297 to both inputs of gate 281 and to the other input of gate 289. The output of gate 281 is connected to the remaining input of gate 288.

Still referring to FIGS. 5 and 6, the Y output pin of comparator 238 is connected by a line 298 to both inputs of gate 282 and to one input of gate 291. The outputs of gates 282 and 289 are connected to separate inputs of gate 290. The Y output pin of comparator 239 is connected by a line 299 to both inputs of gate 283 and to one input of gate 293. The output of gate 283 is connected to one input of gate 292, and the output of gate 291 is connected to the remaining inputs of gates 292 and 293 as shown. The Y output pin of comparator 240 is connected by a line 300 to both inputs of gate 284 and to one input from gate 294, and the output of gate 293 is connected to both of the remaining inputs of gates 294 and 285.

With continued reference to FIG. 6, the outputs of gates 280, 288, 290, 292 and 294 are separately connected to the input sides of a series of NAND gates 302, 303, 304, 305 and 306. The remaining inputs of gates 302-306 are connected by a common line 308 to previously mentioned clock pulse train supply output in control logic circuit 204.

With continued reference to FIG. 6, the outputs of gates 302-305 are connected to the input sides of exclusive NOR gates 310, 311, 312, and 313. The outputs of gates 310-313 are respectively connected to the data input pins of counters 213, 214, 215 and 216 by lines indicated at 316, 317, 318 and 319 in FIGS. 5 and 6. The output of gate 306 is connected directly to the input of counter 217 by a line indicated at 320. The "eight" bit data output pin of counter 214 is connected by a line 322 to the remaining input of gate 310. The "eight" bit data output pin of counter 215 is connected to the remaining input of gate 311 by a line indicated at 323. The "eight" bit data output pin of counter 216 in connected to the remaining input of gate 312 by a line 324, and the "eight" data output pin of counter 217 is connected to the remaining input of gate 313 by a line indicated at 325.

Still referring to FIG. 6, the outputs of gates 280, 288, 290, 292 and 294 are also connected to the input sides of a series of NAND gates 330, 331, 332, 333 and 334. The remaining inputs of gates 330-334 are connected to the clock pulse trains supply line 308. The outputs of gates 330-334 are respectively connected to the input data pins of counters 234, 233, 232, 231 and 230 by lines indicated at 336, 337, 338, 339 and 340.

Still referring to FIG. 6, the output of gate 285 is connected to one input of an exclusive OR gate 342 and the output of OR gate 342 is connected through the output pin A to the input of quotient register 92 by a line indicated at 414. The clock pulse train supply line 308 is also connected to both inputs of a further NAND gate 346. The output of gate 346 is connected to the input of still another NAND gate 348, and the output of gate 348 is connected by a line 350 to a count-compare reset input pin at control logic circuit 204. The other input of gate 348 is connected to the output of still another NAND gate 352, and both inputs of gate 352 are connected to the output of gate 285 as shown.

When certain input signal conditions are satisfied at logic circuit 204, circuit 204, as will be described in detail later on, applies the previously mentioned clock pulse train over line 308 to the input sides of gates 302-306 and 330-334. If any one of the gates 302-306 is enabled by the previously described ladder network of gates, the clock pulses will be applied to the associated one of lines 316-320 and from there to the associated one of counters 214-217 where they are counted in during the count-compare cycle that was previously explained. Likewise, if any one of the gates 330-334 are enabled, the clock pulses will be applied to the associated one of lines 336-340 and from there to the associated one of counters 230-234 where they are counted in during the count-compare cycle that was previously described. Gates 302-306 and 330-334 are disabled and enabled under the control of the previously described ladder gate network.

Until comparator 236 detects coincidence between the data words respectively applied by latch 156a and counter 230, it will apply a logical 0 to line 296. This signal state disables gates 288 and 289 and subsequent gates in the ladder net-work. As a result, gates 303-306 and 331-334 will be disabled so that clock pulses on line 308 cannot be fed to counters 214-217 and 231-234.

The logical 0 on line 296 is inverted by gate 280 to enable gates 302 and 330. Clock pulses on line 308 are therefore simultaneously applied to lines 316 and 336 and from there to the input pins of counters 213 and 230 as previously described.

When comparator 236 detects coincidence between the two data words being compared, it changes the signal state on line 296 to a logical 1, and this signal state is inverted by gate 280 to disable gates 302 and 330 and thereby block the application of further clock pulses to counters 213 and 230. If the signal state on line 296 is already a logical 1, gates 302 and 330 will not be enabled, and no clock pulses will be applied to counters 213 and 230. The logical 1 signal state on line 296 is also applied to gates 288 and 289. If the logical state on line 297 has not detected coincidence between the data words supplied by counter 231 and latch 157a, gate 288 is enabled and gate 289 is held in its disabled condition, thereby preventing clock pulses from being applied through gates 304-306 and 332-334 to counters 215-217 and 232-234. As a result of enabling gate 288, clock pulses will now be applied simultaneously through gates 303 and 331 to counters 214 and 231 respectively.

When the signal state on line 297 goes high (indicating that comparator 237 has detected coincidence between the data words supplied by counter 231 and latch 157a), or if the signal state on line 297 was originally high when the signal state on line 296 became high, gate 288 will be disabled, and gate 289 will apply an enabling signal (a logical 1) to gates 290 and 291. By disabling gate 288, gates 303 and 331 will be disabled, thus blocking the application of clock pulses to counters 214 and 231.

If the signal state on line 298 is low (indicating that comparator 238 has not detected coincidence between the two data words supplied by counter 232 and latch 158a) gate 291 will be disabled to thereby prevent the clock pulses from being applied through gates 305, 306, 333 and 334 to counters 216, 217, 233 and 234 respectively. The logical 0 on line 298 is inverted by gate 282, and as a result, clock pulses on line 308 will be applied simultaneously through gates 304 and 332 to counters 215 and 232 respectively.

When the signal state on line 298 goes high (indicating that comparator 238 has detected coincidence between the two data words supplied by counter 232 and latch 158a), or if the signal state on line 298 was originally high when the signal state on line 297 went high, gate 290 will be disabled, and gate 291 will apply an enabling signal (a logical 1) to gates 292 and 293. By disabling gate 290, gates 304 and 332 will be disabled, thus blocking the application of clock pulses to counters 215 and 232.

If the signal state on line 299 is low (indicating that comparator 239 has not detected coincidence between the two data words supplied by counter 233 and latch 159a), gate 293 will be disabled to thereby prevent clock pulses on line 308 from being applied through gates 306 and 334 to counters 217 and 234 respectively. The logical 0 on line 299 will be inverted by gate 293, and as a result, clock pulses will be applied simultaneously through gates 305 and 333 to counters 216 and 233 respectively.

When the signal state on line 299 goes high (indicating that comparator 239 has detected coincidence between the data words supplied by counter 233 and latch 159a), or if the logical state on line 299 was originally high when the logical state on line 298 went high, gate 292 will be disabled, and gate 293 will apply an enabling signal (a logical 1) to gates 294 and 285. By disabling gate 292, gates 305 and 333 are disabled, thus blocking application of clock pulses to counters 216 and 233.

If the logical state on line 300 is low (indicating that comparator 400 has not detected coincidence between the two data words supplied by latch 160a and counter 234), gate 285 will be disabled, and gate 284 will invert the logical 0 on line 300 to enable gate 294 to apply an enabling signal (a logical 1) to gates 306 and 334. As a result clock pulses will be applied simultaneously through gates 306 and 334 to counters 217 and 234.

When the signal state on line 300 goes high (indicating that comparator 240 has detected coincidence between the two data words being compared), or if the signal state on line 300 was originally high when the logical state on 299 became high, gate 294 will be disabled. As a result, gates 306 and 334 will be disabled to block the application of clock pulses to counters 217 and 234.

When all of the signal states on lines 296–300 become a logical 1, the output of gate 285 and, consequently, the output of gate 342 goes low. This change of signal state is inverted by inverter 343 so that the state at the output of inverter 343 will change from a logical 0 to a logical 1. Also, counters 230–234 will be reset to zero, and, if at this stage, the data word in counters 210–214 is not equal to or greater than the data word at the outputs of latches 156–160, the count-compare cycle in networks 206 and 208 will be repeated.

By resetting counters 230–234 to zero, the signal state on at least one of the lines 296–300 will change from a logical 1 to a logical 0. As a result, the output of gate 342 will go high and the output of inverter 343 will go low to complete a pulse that is applied to quotient register 92. The quotient register will advance on the leading edge of this pulse.

When counters 230–234 are reset for another count-compare cycle, the ladder gate network in circuit 202 will again down shift the clock pulse train in the manner just described, and when the signal states on lines 296–300 again are all high, a pulse will be applied to quotient register 92. This process is continuously repeated until the data word on counters 210–214 becomes equal to or greater than the data word stored on the output pins of latches 156–160. The carry counts from counters 217, 216, 215 and 214 are respectively transferred through gates 313, 312, 311 and 310 to lines 319, 318, 317 and 316 and from there to counters 216, 215, 214 and 213 respectively.

From the foregoing it will be appreciated that the circuit connections in the ladder network of circuit 202 are such that any or all preceding stages, starting with the most significant digit and progressing to the least significant digit, over-ride the suceeding stages to provide the shifting operation of the clock pulse train successively, always filling to exact comparison, from the most significant digit to the least significant digit.

As previously mentioned, the change in the signal state at the output of gate 285 to a logical 1 signifies that all of the comparators 230–234 have been satisfied i.e., detected coincidence). This output of gate 285 is applied through gates 352 and 348 and over line 350 to logic circuit 204. When the signal state at the output of gate 285 becomes a logical 0, the state at the output of gate 348 also becomes a logical 0, and logic circuit 204 is conditioned by this sig-nal state to reset counters 230–234 to zero.

Due to inherent factors in the circuits of this counting system, the resetting of counters 230–234 may not occur all at precisely the same time. As a result, one or more of the counters 231–234 may be reset before counter 230, and if this condition occurs there is a chance that a false count will be added to one or more of the gross divider counters 214–217 if the clock train is high at the moment of reset. Gates 346, 352 and 348 define a logic network 345 which avoids this condition by supplying a logical 0 to the output of gate 348 only when the clock pulse train goes low.

Figure 8:
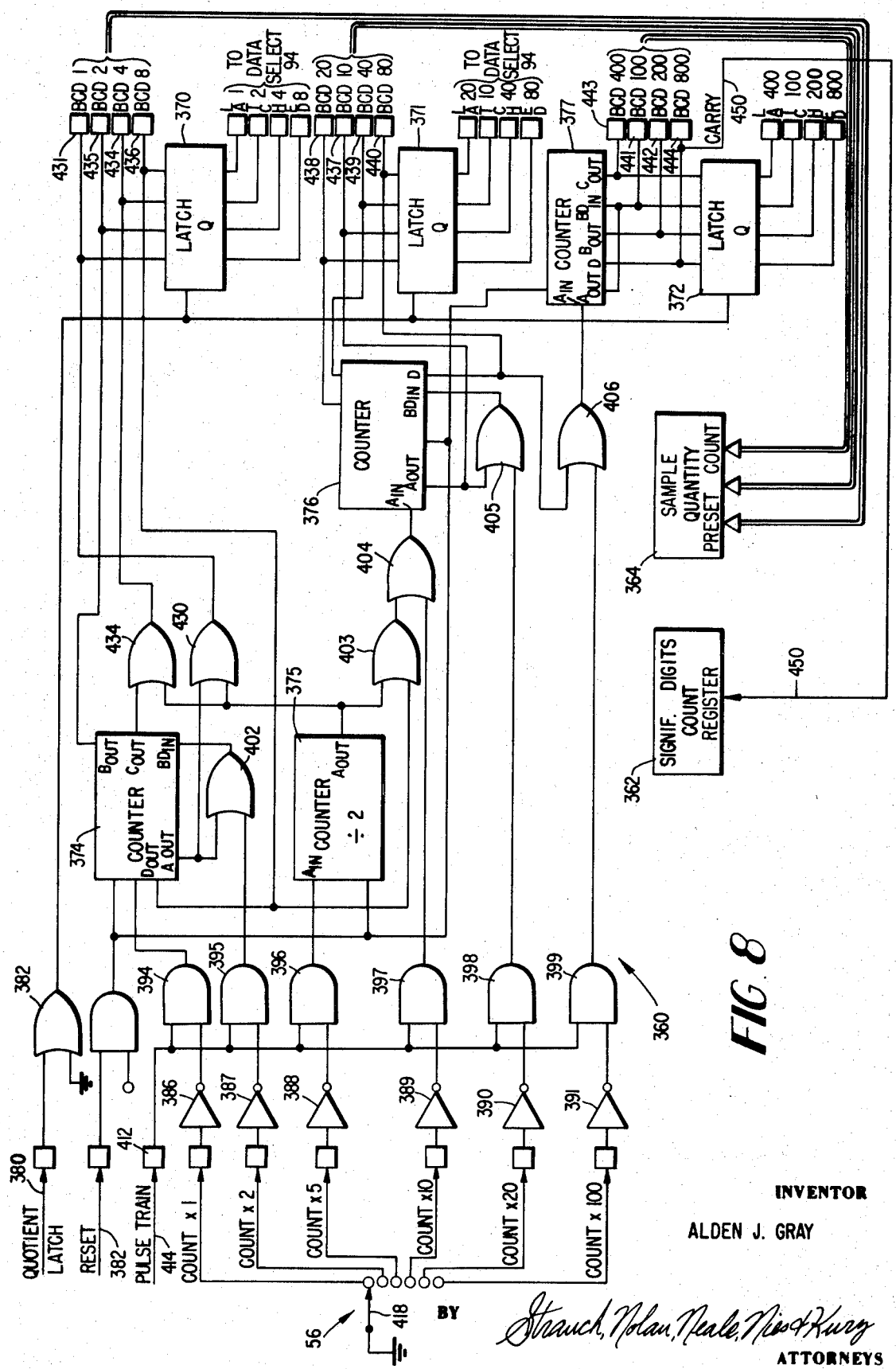
FIG. 8 is a circuit diagram of the quotient count register shown in FIG. 2.

Referring now to FIG. 8, the quotient count register 92 is divided into a programmed count register 360 for lesser significant digits and a significant digit register 362 for digits that are more significant than those stored in register 360. Quotient count register 92 also includes a sample quantity preset circuit 364 which is operative to cause programmed count register 360 to be loaded with the sample quantity number that is set on switch 56 if switch 54 is actuated to include the sample piece or piece or pieces in the read-out of the piece count. Programmed count register 360, as will now be described, is connected to sample quantity selector switch 56 and has the mathematical effect of multiplying the number of piece count pulses supplied by divider control circuit 202 by the number selected on sample quantity selector switch 56.

As shown in FIG. 8, programmed count register 360 includes a 3-decade BCD counter circuit having three BCD latches 370, 371 and 372 and four BCD counters 374, 375, 376 and 377. Latches 370-372 may be of the SN 7475N type, and counters 374-377 may be of the SN 7490N type. Latches 370-372 function in the same manner as latches 156-160 and 156a-160a. The data words supplied by latches 370-372 respectively represent the units, tens and hundreds decades in a six decade number that will be displayed by device 32 or printed by printer 28. Register 364 provides the read-out in the thousands, ten-thousands, and one hundred-thousands decades as will be described in greater detail shortly.

The four Q output pins of each of the latches 370-372 are connected in parallel to data select control circuit 94 to provide a read-out of the three decade numbers represented by the three four-bit data words stored on the Q output pins of the latches. A quotient latch output pin of logic circuit 204 is connected by a line 380 and through an OR gate 382 to the latch pins of latches 370-372. When logic circuit 204 is conditioned in a manner to be described later on, it supplies a latching signal of proper logical state to latches 370-372 to cause latches 370-372 to transfer the data information at their data input pins to their Q output pins and to store the transferred data information on their Q output pins. Logic circuit 204 also supplies the reset signal for counters 374-377 by way of a line indicated at 382. Counters 374-377 together with inverters 386, 387, 388, 389, 390 and 391, AND gates 394, 395, 396, 397, 398 and 399 and OR gates 402, 403, 404, 405 and 406 provide a logic circuit that has the mathematical effect of multiplying the piece count pulses supplied by divider control circuit 202 by the number which corresponds to the pre-selected setting of switch 56. The piece count pulses are supplied from the output of inverter 343 to data input pin 412 of register 360 by a line 414.

As shown in FIG. 8, the inputs of inverters 386-391 are respectively connected to the one's, two's, five's, ten's twenty's and one-hundred's output terminals of sample quantity selector switch 56. The selectively actuatable switch element of switch 56 is indicated at 418 in FIG. 8 and is connected to ground as shown. Switch element 418 is selectively engagable with any one of the above mentioned output terminals to thereby apply ground or a logical 0 to the input of a corresponding one of inverters 386-391. The outputs of inverters 386-391 are respectively connected to the input sides of gates 395-399 to provide enabling and disabling signals for gates 395-399.

Counters 374-377, as shown in FIG. 8, are the same as the counters described in co-pending application 58,259. These counters each have a divide-by-two stage and a divide-by-five stage. The binary weights assigned to those counter output pins A, B, C and D that are shown in FIG. 8 respectively are 1, 2, 4 and 8. Counters 374 and 376 each have connections to operate as a BCD counter in that the A output pin is connected to the input pin of the divide-by-five stage to transfer the output of the divide-by-two stage to the divide-by-five stage as shown. Counter 375 functions as a divide-by-two divider.

The outputs of gates 394 and 396 are respectively connected to the divide-by-two inputs of counters 374 and 375. The output of gate 395 is connected through gate 402 to the divide-by-five input of counter 374, and the output of gate 397 is connected through gate 404 to the divide-by-two input of counter 376. The output of gate 398 is connected through gate 405 to the divide-by-five input of counter 376, and the output of gate 399 is connected through gate 406 to the divide-by-two input of counter 377.

The A input pin of counter 378, in addition to being connected to the divide-by-five input, is also connected through an OR gate 430 to a corresponding data input of latch 370 and to a data output pin 431. The C output pin of counter 374 is connected through an OR gate 432 to a corresponding data input of latch 370 and to an output pin 434. The B and D data output pins of counter 374 are connected to corresponding data inputs of latch 370 and also to data output pins 435 and 436 respectively. The D output pin of counter 374 is also connected through gates 403 and 404 to the divide-by-two input of counter 376. The A output pin of counter 375 is connected through gates 403 and 404 to the divide-by-two input of counter 376 and also through gates 434 and 430 to the same latch input and output pins that connect to the A and C output pins of counter 374.

The A output pin of counter 376, in addition to being connected through gate 405 to the counter's divide-by-five input, is also connected to a corresponding data input of latch 371 and to an output pin 437. The B, C and D data output pins of counter 376 are connected to corresponding data inputs of latch 371 and also to output pins 438, 439 and 440 respectively. The D output pins of counter 376 is also connected through gate 406 to the divide-by-two input of counter 377. The A, B, C and D data output pins of counter 377 are connected in parallel to corresponding data inputs of latch 372 and also to output pins 441, 442, 443 and 444 respectively.

Figure 9:
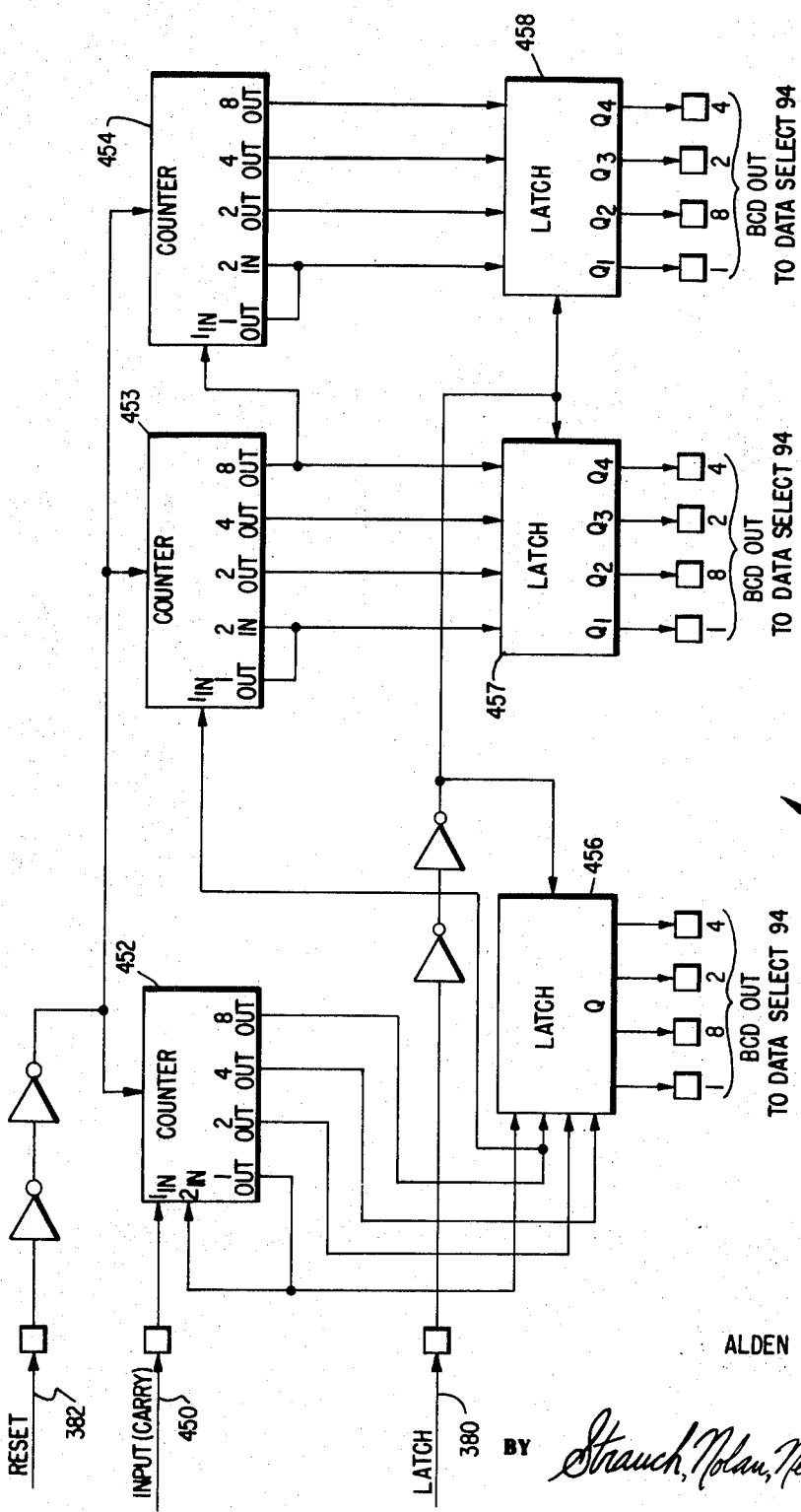
FIG. 9 is a circuit diagram of the most significant digits count register shown in FIG. 8.

The D output pin of counter 377 is also connected by a line 450 to the data input pin of a BCD decade counter 452 in register 362 (FIG. 9). Register 362 has two additional BCD counters 453 and 454 and three latches 456, 457 and 458. Counters 452-454 may be of the SN 7490 type and are connected in the manner particularly described in application Ser. No. 58,259 so that counters 452 and 453 will transfer a count of 1 respectively to counters 453 and 454 for every ten counts coming into the counters. Counter 377 will transfer a count of 1 to the input of counter 452 for every ten counts coming into counter 377. The data outputs of counters 452-454 are connected in parallel to the data input pins of latches 456-458. The latch signal on line 380 is also applied to latches 456-458 along with latches 370-372. The reset signal on line 382 is also applied to counters 452-454 along with counters 374-377. The data words stored on the output pins of latches 456-458 are supplied in parallel along with the outputs of latches 371- 372 to data select control circuit 94 for visual display or print-out in the form of a six decade decimal number.

As previously mentioned, the operator places switch 56 in the position corresponding to the number of pieces on sample scale 22. The circuitry shown in FIG. 8 and described above then has the mathematically effect of multiplying the number of count piece pulses supplied to register 360 by divider control circuit 202 by the number corresponding to the selected setting of switch 56, and, consequently, by the number of pieces on sample scale 22. More particularly, it will be appreciated that when switch element 418 is positioned to engage the 1's output terminal of switch 56 to thereby place a logical 0 at the input of inverter 386, the BCD number that will be stored in the combined outputs of latches 370-372 and 456-458, when a latching signal is supplied, will be equivalent to the number of count piece pulses applied to pin 412 from circuit 202. When switch element 202 is shifted to the 2's output terminal of switch 56, the combined BCD data word stored at the outputs of latches 370-372 and 456-458 will be equivalent to twice the number of count piece pulses supplied by divider control circuit 202 to pin 412, and so on for each of the remaining positions of switch 56. In the final or highest number position of switch 56, the combined data word stored on the outputs of latches 370-372 and 456-458 will be 100 × the number of count piece pulses supplied by divider control circuit 202 to pin 412.

When switch element 418 is positioned at the 1's output terminal to apply a logical 0 at the input to inverter 386, only gate 394 in the bank of gates 394-399 will be enabled to clock through the piece count pulses from pin 412 to counter 374. For every ten pulses coming into counter 374, counter 374 will transfer the count of 1 to counter 376, and for every ten pulses coming into counter 376, counter 376 will transfer the count of 1 to counter 377, and so on. From this it is clear that the register circuit is counting by one's and that counter 375 is by-passed.

When switch element 418 is shifted to its 2's position to apply a logical 0 to the input of inverter 378, only gate 395 will be enabled in the bank of gates 394-399. Count piece pulses from pin 412 will now be transferred directly into the divide-by-five input of counter 374 so that BCD output at counter 374 will advance by the decimal equivalent of "2" for every count piece pulse applied to pin 412.

When switch element 418 is shifted to the five's output terminal to apply a logical 0 to inverter 396, then only gate 396 will be enabled in the bank of gates 394-399. As a result, count piece pulses applied to pin 412 will be applied directly to counter 375, and counter 375 will now supply the data simultaneously to the "1" weight data input pin and the "4" weight data input pin of latch 376. Counter 374 will be by-passed so that the BCD input to latch 376 will advance by the decimal equivalent of "5" for every count piece pulse applied to pin 412.

When switch element 418 is shifted to the 10's position to apply a logical 0 at the input of inverter 389, only gate 397 in the bank of gates 394-399 will be enabled. As a result, count piece pulses at pin 412 will be applied directly to counter 376, and counters 374 and 375 and latch 370 will be by-passed. Thus, for every incoming count piece pulse, the input at latches 370-372 and 456-458 will be advanced by the decimal equivalent of "1" in the tens decade. When switch element 418 is shift to its 20's position to apply a logical 0 to the input of inverter 390, only gate 398 in the bank of gates 394-399 will be enabled to transfer the count piece pulses directly to the divide-by-five input of counter 376. Now, the BCD input to latches 370-372 and 456-458 will be advanced by the decimal equivalent of "2" in the tens decade. Finally, when switch element 418 is shifted to its hundred's position to apply a logical 0 to the input of inverter 391, only gate 399 in the bank of gates 394-399 will be enabled. Now, the piece count pulses will be transferred directly to the input of counter 377, by-passing counters 374-376. As a result, the input to latches 370-372 and 456-458 will advance by the decimal equivalent of "1" in the hundreds decade.

Referring now to FIG. 10, sample quantity preset circuit 364 comprises a series of four comparators 470, 471, 472 and 473 and an output NAND gate 474. Comparators 470-473 may be of the same type as the previously described comparators in networks 206 and 208.

Output pins 431 and 434-436 (FIG. 8) are connected in parallel by lines 476 to one input side of comparator 470 to thus apply the same data to comparator 470 that is applied to the units decade latch 470. The one's, two's and five's output terminals of switch 56 are also connected respectively through inverters 482, 483 and 484 to the 1, 2 and 4 BCD data inputs on the other input side of comparator 470. The five's input terminal of switch 56 is also connected through an inverter 485 to "1" BCD input pin of comparator 470.

The ten's and twenty's output terminals of switch 56 are connected respectively through inverters 486 and 487 to the "1" and "2" BCD input pins on one input side of comparator 471. The output pins 437-440 are connected in parallel by lines 478 to corresponding data input pins at the other input side of comparator 471 to thus apply the same data word to comparator 471 that is applied to the input of the tens decade latch 371.

The hundred's output terminal of switch 56 is connected through an inverter 488 to the "1" BCD input on one input side of comparator 472. The output pins 441-444 are connected in parallel by lines 480 to corresponding data input pins at the other input side of comparator 472 to apply the same data word to comparator 472 that is applied to the hundreds decade latch 372. The unused data pins in comparators 470-473 are grounded to apply a logical 0 to each unused data pin. Thus, when switch 54 is opened, the logical states on the sample quantity selector switch sides of comparators 270-273 will all be low or at a logical 0 level except for that data pin that is connected to the switch terminal which is engaged by switch element 418.

Switch 54 is connected to all of the comparator input pins that the output terminals of switch 56 is connected to. When switch 54 is in its opened position, the number of pieces on sample scale 22 will be included in the piece count along with the number of pieces on gross scale 20. When switch 54 is actuated to its closed position it grounds and thereby applies a logical 0 to each of the comparator pins that the output terminals of switch 56 are connected to. Under this condition, the number of pieces on sample scale 22 will not be counted in as will be described in greater detail shortly.

The X output pins of comparators 470-472 are connected to one input side of comparator 473 and the Y output pins of comparators 470-472 are connected to the other input side of 473. The X and Y output pins of comparator 473 are connected to the input side of gate 474. When the 6-bit data word supplied by switch 56 is greater than the combined data word supplied counters 374-377, the signal states on the X and Y output pins of comparator 473 will respectively by high and low, and the output of gate 474 will consequently be high. When the combined data word supplied by counters 374-377 becomes equal to that supplied by switch, the signal state at the Y output pin of comparator 473 will change to a logical 1 and the signal state at the X output pin of comparator 473 will remain a logical 1. As a result, the signal state at the output of gate 474 will change to a logical 0 or a low.

Assume that switch 54 is placed in its open or "include sample" position. When the system is reset at the start of a count cycle, counters 374-377 will be reset to zero. As a result, the combined data word at the sample quantity selector switch side of comparators 470-472 will be greater than the combined data word presented to latches 370-372. Logic circuit 204 will consequently be conditioned, as will be described later on, to supply a serial train of clock pulses over the preset clock line 344 to the input side of OR gate 342 (FIG. 6) before the division and piece count cycle is initiated. These clock pulses are transferred through gate 342 to input pin 412 (FIG. 8). From there the clock pulses are transferred through the gate in the bank of gates 394-399 that has been enabled by the selected position of switch element 418. Consequently, these clock pulses will be counted in by the ones of counters 374-377 in the active circuit to advance the BCD output pins 431, 434-436 437-440 and 441-444 towards coincidence with the 6-bit BCD data word supplied by switch 56 to the other input sides of comparators 470-472.

When coincidence is reached, or more specifically, when the data information supplied by pins 431, 434-436, 437-440 and 441-444 equals the data information supplied by the setting of switch 56, then the signal state at the Y output pin of comparator 473 goes high and is inverted by gate 473. This inverted signal is supplied back to logic circuit 204 which responds to the inverted signal to terminate the application of the clock pulses to line 344 and to apply the clock pulses to line 308 for initiating the previously described count-compare cycle. At this stage, therefore, the counters 374-377 will be preset or pre-loaded with a count that corresponds to the setting of switch 56. If, for example, switch 56 is set to the position corresponding to the number 20, then the BCD equivalent of this number will now be loaded in counters 374-377 before divider control circuit 202 is activated to supply the count piece pulses to pin 412.

When divider control circuit 202 now supplies count piece pulses to pin 412 as a result of the previously described count-compare cycles in networks 206 and 208, the count piece pulses will be added to those that were preset into counters 374-377 before the division process began to provide a read-out of the total number of pieces on both the gross and sample scales.

If switch 54 is closed so that all of the logical states on the selector switch sides of comparators 470-472 go low, there will be coincidence at the beginning of the counting cycle because, at this stage, counters 474-477 are reset to zero. As a result, the output of gate 474 will be a logical 0 to condition logic circuit 204 to block the transfer of clock pulses to line 344 and to apply the clock pulse train to line 308 for initiating the previously described count-compare cycle.

Figure 7:
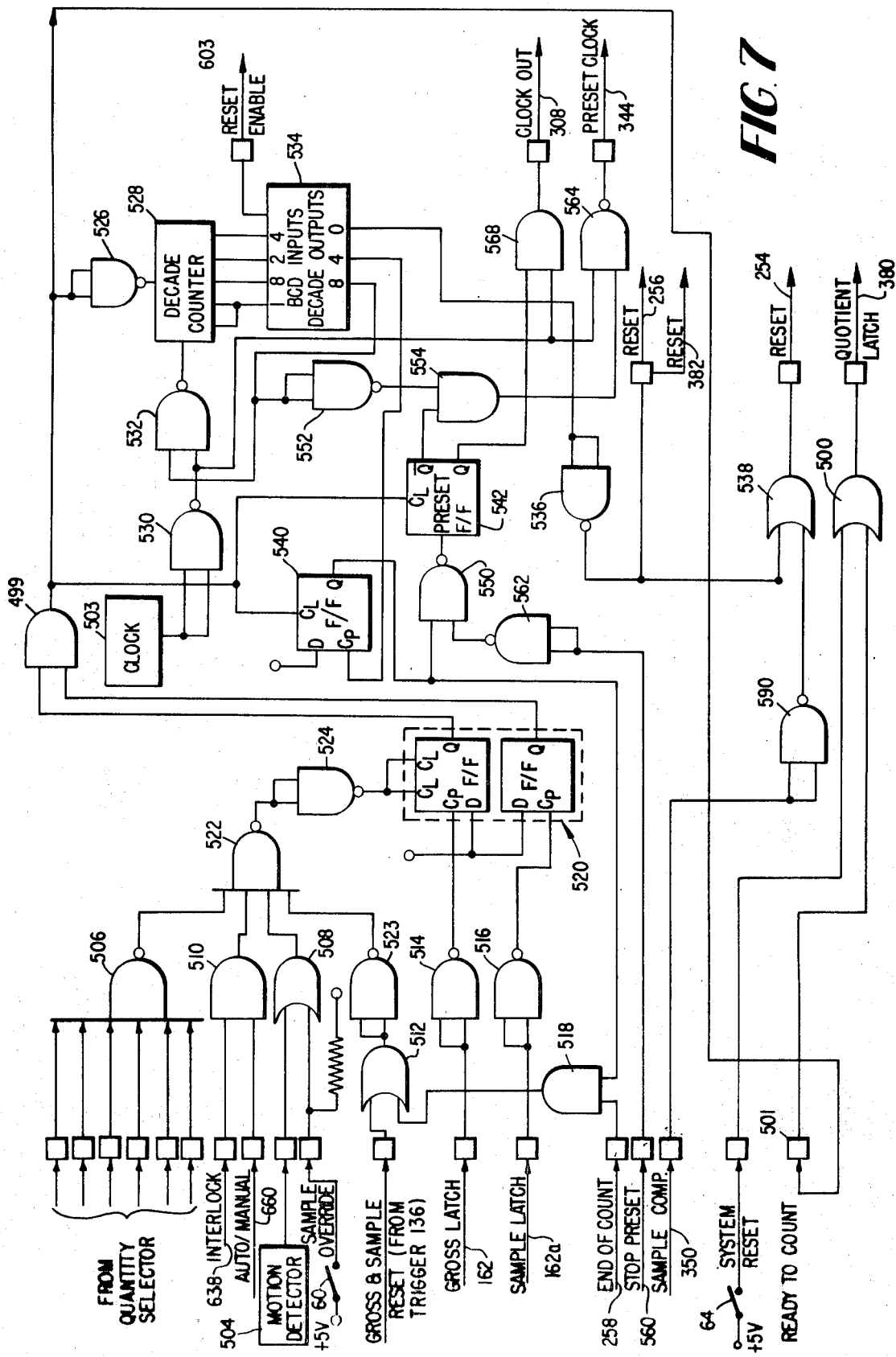
FIG. 7 is a circuit diagram of the control logic circuit shown in FIG. 5.

Referring now to FIG. 7, the quotient latch line 380 is connected to the output of an OR gate 500 in logic circuit 204. One input to gate 500 is provided by the system reset switch 64. The other input to gate 500 is provided by the logic in circuit 204 and is applied through a pin 501 from the output of an AND gate 499. As long as the output of gate 500 is a logical 1 or high, the quotient memory of latches 370-372 and 456-458 is held open. But when the "end-of-count" signal state, which is applied from comparator 226 over line 258 to circuit 204, changes to a logical 1, circuit 204 will be conditioned to change the signal state at the output of gate 500 to a logical 0. This signal state, upon being applied to latches 370-372 and 456-458, causes the latches to latch in or memorize the data words at their inputs, and this action will hold the count that is readout on display device 32 or in printer 28. Thus, when latches 370-372 and 456-458 become latched in, the whole counting cycle will be terminated.

In addition, the signal state at the output of gate 499 is required to a logical 1 in order to transfer clock pulses to line 308 for initiating the previously described count-compare cycle in networks 206 and 208. The clock in logic circuit 204 is indicated at 503.

The signal input conditions that determine the level of signal state at the output of gate 499 are as follows:
1. The output signal condition of sample quantity selector switch 56;
2. A minimum weight interlock signal and an auto/manual signal yet to be described;
3. The output of a sample scale motion detector 504;
4. The reset signal condition on the reset line from trigger circuit 136;
5. The latch signal condition on line 162;
6. The latch signal condition on line 162a; and
7. The "end-of-count" signal condition of line 258.

To provide a signal state of a logical 1 at the output of gate 499, at least one of the sample quantity selector switch signals as applied to a NAND gate 506 must be low, the output of motion detector 504 as applied to OR gate 510 must be high, and a high pulse must be applied by the trigger circuit reset to OR gate 512 followed by a high latch pulse applied from line 162 to NAND gate 514 and by a high pulse applied from line 162a to NAND gate 516.

Thus, before the signal state at the output of gate 499 can go high, converter 80 and the associated circuitry must complete one full cycle of digitizing both the sample weight and gross weight information, translating the converter-produced pulse trains into BCD form and storing the gross weight BCD information and the sample weight BCD information on the outputs of latches 156–160 and 156a–160a respectively.

Motion detector 504 may be of any suitable form and is preferably of the type described in co-pending application Ser. No. 123,746, filed on Mar. 12, 1971 for "Motion Detector For Weighing Apparatus" and assigned to the assignee of this application. This type of motion detector is under the control of the sample weight count register latch that is supplied by switching circuit 140, and this sample weight latching signal conditions motion detector 504 to act on only the converter-produced sample weight pulse trains and to indicate if sample scale 22 is in motion. If scale 22 is in motion, motion detector 504 will supply a signal state of a logical 0 to gate 508 to prevent the signal at the output of gate 499 from becoming high. If motion of sample scale has stopped, the output of detector 504 will supply a logical 1 to gate 508 to satisfy the one of foregoing input signal conditions for placing the counting system in a condition to count or, more specifically, to start a division cycle.

Motion detector 504 may be overridden by actuating switch 60 to apply a logical 1 to the other input of gate 508. If desired, other input signal conditions shown in FIG. 7 may be overridden in a corresponding manner.

Still referring to FIG. 7, the outputs of gates 506, 508, and 510 are connected to the input side of a NAND gate 522, and the output of gate 512 is connected through another NAND gate 523 to the input side of gate 522. When all of the inputs to gates 506, 508, 510 and 512 are satisfied for starting a count, or more particularly, a division cycle, all of the inputs to gate 522 will go high, and the output of gate 522 will become a logical 0. This signal level is inverted by a NAND gate 524 and applied as a high to the clear pins of flip flop 520. Thus, the signal input to the clear pins of flip flop 520 will change from a low to a high, the low having cleared the flip flop in preparation for a preset.

After the logical state at the clear pins of flip flop 520 has changed from a low to a high, signifying that the reset signal has been applied to counters 150–154 and 150a–154a, the logical state on line 162 will change from a high to a low, followed by the changing of the logical state on line 162a from a high to a low, signifying that the latching signals have been applied to latches 156–160 and 156a–160a to latch in or memorize the counter-supplied data information at the input pins of the latches. These lows on lines 162 and 162a are applied through gates 514 and 516 to the preset pins of flip flop 520 to preset the flip flop.

By presetting flip flop 520 a logical 1 will be supplied at the Q output pins of the flip flop. As a result, the signal state at the output of gate 499 will become high to open the memory at quotient latches 370–372 and 456–458. Also, the logical 1 state at the output of gate 499 will be inverted by a NAND gate 526 and applied to enable a BCD decade counter 528.

When counter 528 is enabled it will count in the pulses in the pulse train generated by clock 503. The clock pulse train is connected to the data input of counter 528 serially through NAND 530 and 532. The four-bit BCD output of counter 528 is applied to the data input of a decoder 534 which translates the BCD input data into a decimal output.

When the output of gate 526 is high, before a counting cycle, the output of gate 499 goes low to reset counter 528 to zero. This output state of counter 528 is decoded as a zero by decoder 534, and as a result, the logic state on the zero output pin of decoder 534 goes low. This logic state is inverted by a NAND gate 536 and then applied to reset line 256 to reset counters 374–377 and 452–454 to zero. In addition the reset pulse supplied by gate 536 is applied through or OR gate 538 to reset line 254 to ensure the counters 230–234 are reset to zero.

When the output of gate 499 goes high, signifying the beginning of a count cycle, the output of gate 526 goes low to enable counter 528 so that it will now start to count in pulses from clock 503. In response to the first clock pulse that is counted in by counter 528, the logic state at the zero output of decoder 534 goes high and enables counters 210–217, 374–377, 452–454 and 230–234. Decoder 534 thereafter responds to the successive count-in of the fourth and fifth clock pulses by counter 534 to supply a negative going pulse at its "438 output pin which is connected to the CP pin of a flip flop 540. Since the output of gate 499 is applied to the CL pin of flip flop 540 and has previously changed from a low to a high, flip flop 540 will be triggered by the trailing edge of the above-mentioned negative going pulse at its CP pin to change the logic state at its Q output pin to a logical 1.

The logic state at the Q output of flip flop 540 is applied to the input of gate 518 and to the input of a NAND gate 550. When the logic state at the Q output pin of flip flop 540 goes high, gates 518 and 550 will be enabled for a purpose to be described in detail later on.

In response to the eighth clock pulse that is counted in by counter 534, the logic state at the "8" output pin goes low to disable gate 532 and thereby block the application of further clock pulses to counter 528. In addition to being connected to one input of gate 532, the "8" output pin of decoder 534 is also connected to both inputs of a NAND gate 552 so that when the eight and final clock pulse is counted in by counter 534, the output of gate 552 goes high to enable an AND gate 554.

As shown, the inputs of AND gate 554 are connected to the output of gate 552 and to the $\bar{Q}$ output pin of a flip 542. The logic state at the $\bar{Q}$ output pin of flip flop 542 will determine whether or not clock pulses are to be gated to the preset clock line 344 for a preset count-in by counters 374–377 before the division or count-compare cycle is initiated at networks 206 and 208.

The logic state at the $\bar{Q}$ output pin of flip flop 542 will be determined by the logic state at the output of gate 474 (FIG. 10). It will be recalled that if switch 54 is closed to thus program quotient count register 92 to count in the number of pieces on sample scale 22, the data word supplied to comparators 470–472 by the sample quantity selector switch 56 will be greater than the data word supplied to comparators 470–472 by the counters in the programmed counter register 360. As a result, the logic state supplied at the output of gate 474 will be high. The output of gate 474 is connected by a stop-preset line 560 to both inputs of a NAND gate 562. The output of gate 562 is connected to the remaining input of gate 550, and the output of gate 550 is connected to the preset pin of flip flop 542.

The logical 1 that is supplied at the output of gate 474 (signifying non-coincidence between the data words compared by comparators 470-472) will be inverted by gate 592 and applied to gate 550 which has already been enabled. As a result, the logic state applied to the preset pin of flip flop 542 will be high to provide a logical 0 at the $\overline{Q}$ output pin of flip flop 542. Gate 554, which is connected to one input of a NAND gate 564, will therefore supply a high to enable gate 564. The output of gate 564 is connected to the preset clock line 344, and the other input of gate 564 is connected to the output of gate 530 to receive the serial pulses that are generated by clock 503.

From the foregoing it is clear that gate 364 will be enabled to gate clock pulses to line 344 when a logic 1 on the stop preset line 560 conditions flip flop 542 to supply a logical 1 to gate 554. The clock pulses transferred through gate 564 are applied by line 344 to gate 342 (FIG. 6), and from there the clock pulses are transferred through gate 342 and applied by line 414 to input pin 412 (FIG. 8) for count-in by the counters in programmed count register 360 in the manner previously described.

When comparators 470-472 detect coincidence as a result of counting in a sufficient number of clock pulses in programmed count register 360, the logic state at the output of gate 474 goes low, and the logic state, upon being applied through gates 562 and 550, will cause the logic state at the preset pin of flip flop 542 to go low. As a result, the logic state at the $\overline{Q}$ output pin of flip flop 542 will go low to disable gate 554 which, in turn, disables gate 564. As a result, gate 564 will block the application of further clock pulses to line 344, and the counters in programmed count register 360 will be preset or pre-loaded with the BCD equivalent of the number that was selected on switch 56.

If switch 54 is selectively closed in condition quotient count register 92 not to include the number of sample pieces that is selected by the setting of switch 56, then comparators 470-472 will detect coincidence upon resetting counters 374-377 to zero. As a result, the logic state supplied by gate 474 will be low, and this logic state results in the application of a logical 0 to the preset pin of flip flop 452. The logic state at the $\overline{Q}$ output pin of flip flop 452 will therefore be held at a logical 0, and both gates 554 and 564 will remain disabled so that no clock pulses will be transferred to the preset clock line 344.

As shown in FIG. 7, the clock pulse supply line 308 is connected to the output of an AND gate 568. The inputs of gate 568 are respectively connected to the output of gate 530 and to the Q output pin of flip flop 542. Thus when gate 564 is enabled, gate 568 will be disabled, and when gate 568 is enabled, gate 564 will be disabled. Therefore, clock pulses can only be supplied to either one of the lines 344 and 308, but not to both at the same time.

When the logic state at the preset pin of flip flop 542 goes low, the flip flop will be forced to provide a high at its Q output pin to enable gate 568. Clock pulses will now be transferred through gate 568 and applied by line 308 to gates 302-306 and 330-334 in divider control circuit 202 for utilization in the previously described count-compare cycle.

It will be recalled that the clock pulses supplied by line 308 are counted in by counters 210-217 and 230-234, and when the output of counters 210-214 becomes equal or greater than the output of latches 156-160, the logic state of the signal supplied to line 258 by the Y output pin of comparator 226 will go high. Since gate 518 has already been enabled by flip flop 540, the output of gate 518 will go high. As a result, flip flop 520 will be triggered to change the logic state at each Q output pin to a low. The output of gate 499 therefore goes low, and this logic state will be applied through gate 500 to cause latches 370-372 and 456-458 to latch in or store the count in the counters of quotient count register 92. The counting process is consequently completed with the piece count data being stored on the output pins of latches 370-372 and 456-458 in quotient count register 92, with the gross weight data (representing the weight of the gross lot on scale 20) being stored in the output pins of latches 156-160, and with the sample weight data (representing the weight of the sample lot on scale 22) being stored on latches 156a-160a.

It will be appreciated that the piece count data memorized by latches 370-372 and 456-458 will remain latched in at the output pins of the latches until the output of gate 499 is again changed to a logical 1 or until reset switch 64 is actuated to its closed position to re-open the memory of latches 370-372 and 456-458. Thus, the memorized data at the outputs of latches 370-372 and 546-458 will be held even though the weights on either of the scales 20 and 22 are varied changing the data stored by latches 156-160 and 156a-160a, as by removing the pieces from either scale. Only when reset switch 64 is closed or when all of the previously mentioned logic circuit input signal conditions are satisfied will the memory of latches 370-372 and 456-458 be re-opened to receive new piece count data.

When the output of gate 499 goes low at the end of the counting cycle, gate 526 will supply a low to reset counter 534. As a result, decoder 534 will decode a zero to reset counters 210-217, 374-377 and 452-454. This state at the zero output of decoder 534 will also be applied through gate 538 to ensure that counters 230-234 are reset to zero.

By closing reset switch 64, a high is supplied at the output of gate 500 to open the memory of latches 370-372 and 456-458. It also will be appreciated that when the end-of-count logic state on line 258 changes from a high to a low as soon as the output of gate goes low.

Referring to FIGS. 6 and 7, the count compare reset pulse, which is supplied by divider control circuit 202 to line 350, is applied to both inputs of a NAND gate 590 (which is connected to an input of gate 538) in logic circuit 204. Gate 590 inverts this reset pulse, and the inverted reset pulse is applied through gate 528 to line 254 to reset counters 230-234 to zero.

Sample quantity selector switch 56 is of the type that breaks contact as switch element 418 transferred from one output pin to another. Therefore, if switch 56 is repositioned during a counting cycled, the signal input logic conditions supplied to the input of gate 506 in logic circuit 204 will momentarily become dissatisfied. As a result, the output of gate 499 will momentarily go low to cause the complete counting cycle to be repeated.

Referring to FIGS. 6, 7 and 11, the output of inverter 343 is also connected by a line 600 to an input of an AND gate 602, and a line 603 connects the two's output of decoder 534 through an inverter 604 to the other input of gate 602. As shown in FIG. 11, the output of gate 602 is connected to a flip flop 606 in the data select and control circuit 94. The Q output pin of flip flop 606 is connected to a driver 608 for controlling operation of an indicator lamp 610 which may be located on control panel 34.

When counter 528 counts in the second and third pulses from clock 503, decoder 534 will respond by applying a negative going pulse to line 600. This pulse will be inverted and applied to the input of gate 602 as an enabling signal. At this stage of the operation it will be appreciated that the counters in circuits 90 and 92 have just been enabled by decoder 534 in preparation for a counting cycle. If no weight has been applied to sample scale 22 at this time, the output of gate 342 will be high to apply a logical 1 at the output of gate 602 for presetting flip flop 606. As a result, flip flop 606 will cause driver 608 to illuminate lamp 610 to provide a visual indication that a division by zero will take place in circuit 90 if the previously mentioned interlock to the input of logic circuit 204 has been overridden. As will now be described, the interlock signal to logic circuit 204 is supplied by a circuit 620 (FIG. 11), and the logic of circuit 620 will prevent the interlock input signal condition from being satisfied at logic circuit 204 if a pre-selected minimum weight is not sensed by sample scale 22. If the weight sensed by scale 22 is less than this minimum, the output of gate 499 will not go high. As a result, the memory at latches 370–372 and 456–458 will not be opened, and the counters in circuits 90 and 92 will not be enabled by logic circuit 94. Thus, the counting cycle will not start, and division by zero (as when no weight is sensed by scale 22) cannot take place unless the interlock is overridden.

Figure 12:
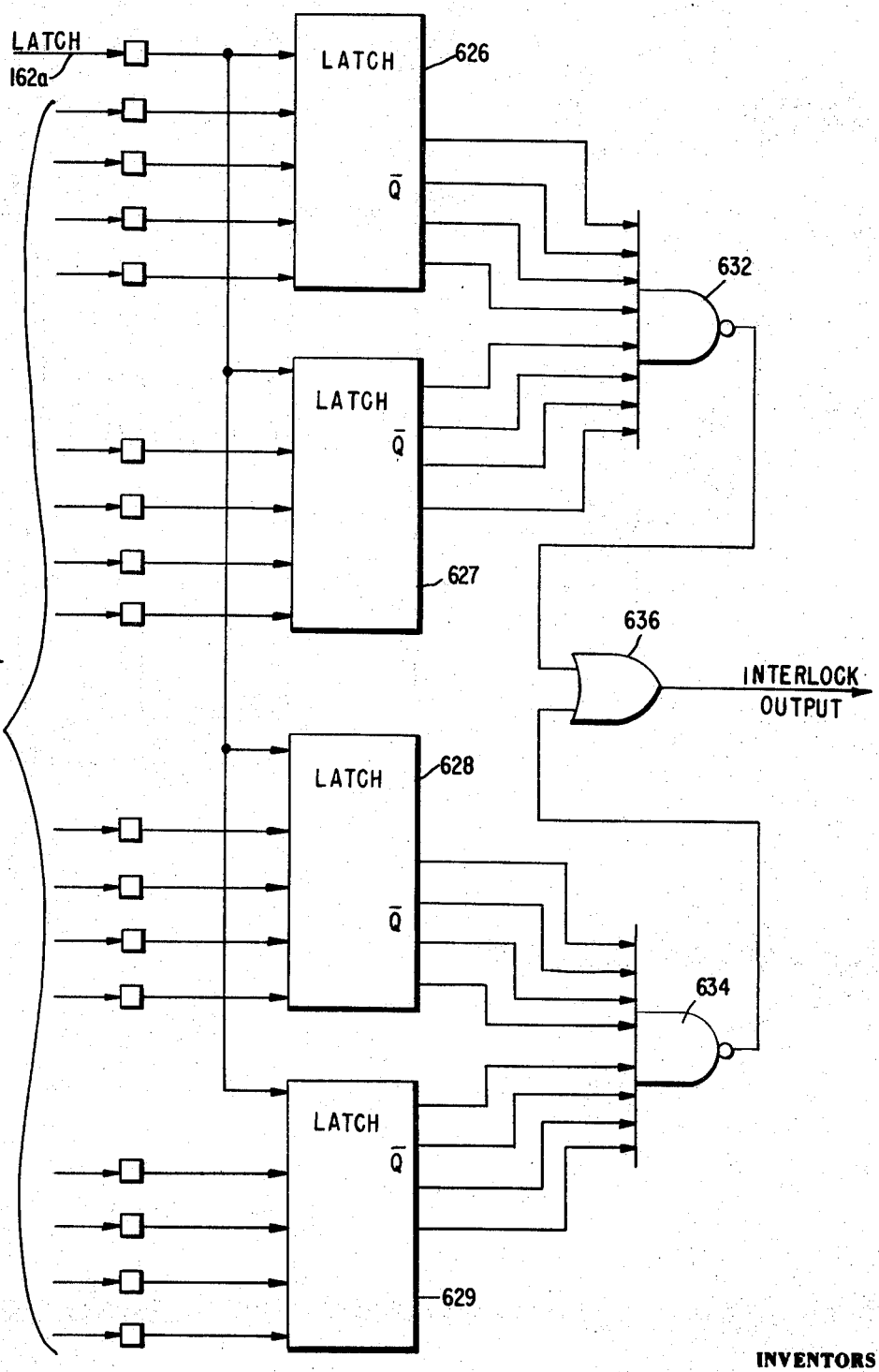
FIG. 12 is a circuit diagram of the interlock circuit shown in FIG. 11.

As shown in FIGS. 11 and 12, circuit 620 comprises an interlock network 622 (FIG. 12), an OR gate 624, and a flip flop 626, Network 622 comprises a series of quad latches 626, 627, 628 and 629 which may be the same as latches 156a–160a. The latch signal for latches 626–629 is supplied by line 162a. The outputs of counters 150a–154a are respectively applied in parallel to the data inputs of latches 626–629 so that latches 626–629 will memorize the same data that is stored by latches 156a–160a. The Q̄ output pins of latches 626 and 627 are applied to the input side of a NAND gate 632, and the Q output pins of latches 628 and 629 are applied to the input side of another NAND gate 634. The outputs of gates 632 and 634 are connected to the input pins of an OR gate 636, and the output of gate 636 is connected to one input of gate 624 (FIG. 11). The output of gate 624 is connected by line 638 to the "interlock" input of gate 510 in logic circuit 204.

If the weight sensed by sample scale 22 is not slightly greater than zero, the BCD output of counters 150a–154a will be zero. As a result, the logic states on all of the Q output pins of latches 626–629 will be high when the latch pulse is supplied by switching circuit 140 to latches 626–629 to cause latches 626–629 to store the data supplied by counters 150a–154a. As a result, the logic states at the outputs of gates 632 and 634 will be low, and this logic state is applied by line 638 to the input of logic circuit 204 to prevent the logic state at the output of gate 499 from going high unless the interlock is overridden. The memory at latches 370–372 and 456–458 therefore will not open, and the counters in circuits 90 and 92 will not be enabled.

If the weight sensed by sample scale 22 is sufficiently high to apply a logical 1 to at least one of the data input pins of latches 626–629, then the output of either gate 632 or gate 634, or both, will go high depending upon the data word supplied by counters 150a–154a to the inputs of latches 626–629. As a result, a high will be applied to the input of gate 510 to satisfy the interlock signal input condition to logic circuit 204 and to thereby enable the output of gate 499 to go high if the other input conditions are satisfied.

The interlock provided by circuit 620 may be overridden by selectively closing switch 65, which, as shown in FIG. 11, is connected to the preset pin of flip flop 626. By closing switch 65, a logical 0 is applied to the preset pin of flip flop 626 to trigger the flip flop and thereby place a logical 1 on the Q output pin of the flip flop.

The Q output pin of flip flop 626 is connected to the remaining input of gate 624 so that when the logic state at the Q output pin of flip flop 626 goes high, a high will be applied to the input of gate 510 in logic circuit 204 for satisfying the interlock signal input condition. The Q output pin of flip flop 626 may also be connected to a driver 640 for illuminating a lamp 642 to signify that switch 65 has been closed to override the interlock function of circuit 620, thus presenting the possibility of entering a zero divisor in circuit 90. Reset switch 64 is connected to the clear pin of flip flop 626. Switch 64 must be momentarily closed to clear the flip flop.

As shown in FIG. 11, the circuit for selecting the data to be displayed by device 32 and printed by printer 28 is indicated at 650 and comprises a series of flip flops 652, 653 and 654 which may be of the SN 7474D type. Corresponding terminals of switches 50 and 51 are connected to the preset pins of flip flops 652 and 653 respectively, and the corresponding terminal of switch 52 is connected to the clear pin of flip flop 654 switch 50 is also connected through diodes to the preset pin of flip flop 654 and to the clear pin of flip flop 653. Switch 51 is also connected through diodes to the clear pin of flip flop 652 and to the preset pin of flip flop 654. Switch 654 is also connected through diodes to the clear pins of flip flop 652 and 653. The other terminals of switches 50–52 are grounded as shown. The Q output pins of flip flops 652 and 653 are connected to a suitable decoder 658 for display device 32 and printer 28. The outputs of latches 156–160, 156a–160a, 370–372 and 456–458 are connected to decoder 658. Decoder 658 is under the control of flip flops 652 and 653. The Q output pins of flip flops 652 and 653 are connected to decoder 658, and the Q output pin of flip flop 654 is connected by an auto/manual line 660 to the input side of gate 510 in logic circuit 204.

Still referring to FIG. 11, the Q̄ output pin of a flip flop 662 is connected through diodes to the clear pins of flip flops 652 and 653 and to the preset pin of flip flop 654. The output of a gross motion scale detector 664 is connected to the D input pin of flip flop 662, and the Y output pin of comparator 226 is connected by a line 666 to the input of an inverter 668, the output of which is connected to the CP pin of flip flop 662.

Gross motion detector 664 is preferably of the same construction as sample motion detector 504. Gross motion detector 664 is controlled by the gross weight latching signal on line 162 so that it is responsive only to the gross weight pulse trains at the output of converter 80. If detector 664 senses an unstabilized condition of scale 20, it will supply a logical 0 to flip flop 662. If detector 664 senses a stabilized (i.e., no motion condition at scale 20) it supplies a logical 1 to flip flop 662.

Two basic conditions for circuit 650 will be considered: The presence of a logical 1 at the $\overline{Q}$ output pin of flip flop 662, in which case flip flops 652-653 will be in their quiescent states; and the presence of a logical 0 in which case flip flops 652-653 will be in their nonquiescent states.

Considering the former of the two above-mentioned conditions first, the logic state at the Q output pin of flip flop will not go low until an end-of-count pulse is applied by comparator 226 (signifying the completion of a division and piece count cycle) and a high is supplied by detector 664 (signifying that stabilization of scale 20 has been detected).

As a result of applying a logical 1 to flip flop 654, the selective closing of switch 52 and resulting application of a logical 0 to the clear pin of flip flop 654 will cause flip flop 654 to apply a logical 1 to auto/manual line 660. As a result, the auto/manual input signal condition to logic circuit 204 will be satisfied, and if the other previously mentioned input signal conditions are satisfied, the output of gate 499 will go high to open the memory at latches 370-372 and to enable the counters in registers 90 and 92. Since the other input conditions to circuit 204 can be satisfied at this time, the closing of switch 52 has the effect of initiating a division and piece counting cycle.

Before comparator 226 supplies and end-of-count pulse to flip flop 662, either of the flip flops 652 or 653 may be triggered to cause the flip flop to memorize a logical 1 on its Q output pin. Flip flop 652 may be triggered in this manner by closing switch 50 to apply a logical 0 to the preset pin of the flip flop. Closing of switch 50 thus provides a logical 1 and a logical 0 at the Q output pins of flip flops 652 and 653 respectively. These signal states will condition decoder 658 to enable the gross weight data (representing the weight on scale 20) to be transferred to display device 32 and to the input of printer 28 and to disable the transfer of the sample weight data (i.e., the weight on sample scale 22) and the piece count data to display device 32 and printer 28. The gross weight information will be held on display device 32 even though switch 50 is re-opened, and to remove this information from the display it is necessary to close switch 52 and thus apply a low to the clear pin of flip flop 652 to clear the flip flop. Closing of switch 652 will also clear flip flop 653. The display and removal of the sample weight data is done in the same manner by utilizing switch 51 instead of switch 50.

If either of the switches 50 or 51 is closed while a logical 1 is supplied by flip flop 662, flip flop 654 will be cleared to place a logical 0 on line 660 and to thereby stop the division and piece counting cycle. To re-start the division and piece counting cycle, it is necessary to again close switch 52 for applying a logical 1 to auto/manual line 660.

Very shortly after comparator 226 supplies an end-of-count pulse to flip flop 662, the memory at latches 370-372 and 456-458 will be closed, and the end-of-count pulse will trigger flip flop 662 to apply a logical 0 to the clear pins of flip flops 652 and 653 and to the preset pin of flip flop 654. As a result, decoder 658 will normally be condition by flip flops 652 and 653 to display the piece count stored by latches 370-372 and 456-458. The gross weight data and sample weight data still may be read out at this stage by closing the proper one of switches 50 and 51, but when each of these switches is released, allowing it to open, the weight data will automatically be replaced by the count-piece data on display 32. Switches 50-52 are of the spring-loaded pushbutton type.

When a logical 0 is applied by flip flop 662 to the preset pin of flip flop 654, the logic state on auto/manual line 660 goes low to keep logic circuit 204 from starting a new division and piece count cycle after it receives the end-of-count pulse from comparator 226. To initiate a new cycle switch 52 must therefore be closed again.

Flip flops 652-654 may also be connected to drivers 690 for illuminating gross, sample and count lamps 692 as shown. The $\overline{Q}$ output pin of flip flop 662 is also connected to a driver 694. Driver 694 responds to a logical 0 at the $\overline{Q}$ output pin of flip flop 662 to illuminate a "-Print Ready" lamp 696 and to supply activating current to print switch 58. Illumination of lamp 696 signifies that conditions are now acceptable for printing the piece count data stored in latches 370-372 and 456-458.

With the foregoing piece counting system, an operator may place a pre-selected number of sample pieces on sample scale 22, adjust switch 56 to the number corresponding to the number of pieces placed on scale 22, place an empty container on scale 20, tare out the weight of the container, operate switch 54 to either include or not include the sample pieces on the sample scale, and pour pieces into the empty container and observe the visual read-out of the piece count on display device 32, which will be continually up-dating itself. Thus the operator can stop the delivery of pieces to the container when a desired number of pieces have been delivered to the container.

Since the weight on gross scale 20 is continuously changing by the delivery of pieces to the container, the logic state supplied by gross motion detector 664 will be low (indicating motion) and this logic state will hold the state at the $\overline{Q}$ output pin of flip flop 662 high. As a result, the logic state supplied at the $\overline{Q}$ output pin of flip flop 654 and an auto/manual line 660 will remain high. The input signal condition to logic circuit 204 therefore remain satisfied and the memory at latches 370-372 and 456-458 consequently remains open to be updated as the weight on scale 20 changes. The counting system of this invention provides accurate, rapid, and reliable read-outs of the weight and piece count data.

What is claimed and desired to be secured by Letters Patent is:

1. In a piece counting system for determining the number of pieces having substantially equal weights in a given lot, means for developing a first digital signal that is representative of the weight of an unknown number of said pieces in a lot, means for developing a second digital signal that is representative of the weight of a known number of said pieces, means receiving said first and second signals and providing predetermined digital comparisons involving said first and second signals for producing a serial pulse train in which the number of pulses is substantially proportional to the quotient of the weight represented by said first signal divided by the weight represented by said second signal, and means for summing the pulses in said train and providing a read-out that is a function of said summation.

2. The piece counting system defined in claim 1 including means for preventing said pulse train producing means from producing said pulses whenever said second signal is less than a pre-selected value.

3. In a piece counting system for determining the number of pieces having substantially equal weights in a given lot, first means for weighing a lot of said pieces in which the number of pieces is to be determined and for producing a first electrical signal that is representative of the weight of said lot, second means for weighing a known, pre-selected number of one or more of said pieces and for producing a second electrical signal that is representative of the weight of said known number of pieces, circuit means, programming means for selectively and optionally producing a plurality of different predetermined electrical signals respectively representing a plurality of different pre-selected numbers and for applying an selected one of said predetermined signals to said circuit means, said circuit means responsive to said first signal, said second signal and the selected one of said plurality of different predetermined signals to supply an output that is representative of the number of pieces in said lot when the selected number of pieces making up said known number of pieces corresponds to the pre-selected number represented by the selected one of said plurality of different predetermined signals, and selectively operated means for optionally conditioning said circuit means for alternatively providing said output with a value that is representative of the sum of the number of pieces in said lot and the pre-selected number that corresponds to the selected one of said predetermined signals that is applied to said circuit means.

4. In a piece counting system for determining the number of pieces having substantially equal weights in a given lot, means for producing an electrical signal that has a value which is representative of the quotient of the weight of an unknown number of said pieces in a gross lot divided by the weight of a known, pre-selected number of one or more of said pieces, selectively operable means for optionally selecting different pre-selected numbers, and circuit means operatively connected to said electrical signal producing means and to said selectively operable means, said circuit means having the mathematical effect of multiplying the quotient-representing value of said electrical signal by the optionally selected one of said different pre-selected numbers to provide a read-out of the number of pieces in at least said gross lot when the number of pieces making up said known, pre-selected number of said pieces is the same as the optionally selected one of said different numbers that said quotient-representing value is multiplied by.

5. The piece counting system defined in claim 4 wherein said electrical signal is in the form of a pulse train in which the number of pulses is substantially proportional to said quotient, and wherein said circuit means comprises counter means for counting in said pulses.

6. The piece counting system defined in claim 5 wherein said counter means is operatively connected to said selectively operable means to provide an output representing the number of counted pulses multiplied by the selected one of said different pre-selected numbers.

7. The piece counting system defined in claim 5 wherein said selectively operable means is connected to said counter means for preloading said counter means to provide an output that represents the selected one of said different predetermined numbers before said pulse train is supplied to counted in by said counter means.

8. In a piece counting system for determining the number of pieces having substantially equal weights in a given lot, means for weighing a lot of said pieces and for producing a first electrical signal that is representative of the weight of said lot, means for producing a second electrical signal that is representative of the weight of a selected, known number of said pieces, circuit means responsive to said first and second signals for providing a read-out of the number of pieces in said lot, and means for selectively conditioning said circuit means to alternatively provide a readout of the sum of the number of said known pieces and the number of pieces in said lot when the number of said known pieces in any of a plurality of different pre-selected numbers.

9. In a weighing system having first and second weighing means for respectively producing first and second electrical analog signals that are functions of loads applied to said first and second weighing means respectively, an analog-to-digital converter for converting an electrical analog signal supplied to its input into a digital signal, first and second digital signal storage means connected to the output of said converter for receiving the converted digital signals supplied by said converter, and control means for (a) alternately and cyclically applying said first and second analog signals to the input of said converter, (b) controlling said first storage means to store the converter-produced digital signals corresponding to said first analog signal but not the converter-produced digital signals corresponding to said second analog signal, and (c) for controlling said second storage means to store the converter-produced digital signals corresponding to said second analog signal but not the converter-produced digital signals corresponding to said first analog signal.

10. In a piece counting system for determining the number of pieces having substantially equal weights in a given lot, means for developing a first electrical signal that is representative of the weight of an unknown number of said pieces in a lot, means for developing a second electrical signal that is representative of a known number of said pieces, means under the control of said first and second signals for developing a third electrical signal that is representative of the number of pieces in said lot, means for separately and electrically storing said first, second, and third signals in the form of data, data read-out means for providing a read-out of data supplied to the input thereof, and data selector means operatively connected to said means for storing said first, second, and third signals and to said data read-out means for selectively controlling the data input to said read-out means to provide for the optional read-out of said first, second, and third stored signals.

11. In a piece counting system for determining the number of pieces having substantially equal weights in a given lot, means including a first weighing apparatus for weighing an unknown number of said pieces and for developing an electrical signal that is representative of the weight of said unknown number of pieces, means including a second weighing apparatus for weighing a known number of pieces and for developing a second electrical signal that is representative of said known number of pieces, first circuit means under the control of said first and second signals and having the mathematical effect of dividing said weight of said unknown number of pieces by the weight of said known number of pieces to provide a third signal that is representative of the quotient of said division, means responsive to said third signal for providing a read-out of number of pieces applied to said first weighing apparatus, and second circuit means controlling said first circuit means for preventing said first circuit means to effect said division in response to a value of said second signal that is representative of zero weight.

12. The piece counting system defined in claim 11 comprising means for selectively overriding the control of said first circuit means by said second circuit means, and means providing an indication whenever the weight represented by said second signal is less than a predetermined value.

13. In a piece counting system for determining the number of pieces having substantially equal weight in a given lot, means including a weighing apparatus for weighing an unknown number of said pieces and for producing an electrical signal that is indicative of the weight of said unknown number of pieces, means for producing an electrical signal that is indicative of a known number of said pieces, a circuit responsive to said first and second signals for developing an electrical digital signal that is indicative of the number of pieces weighed by said weighing apparatus, said first signal being varied by variations in the weight applied to said weighing apparatus to cause variations in the value of said digital signal, signal storage circuit means receiving said digital signal and having a memory that is capable of being opened and closed, said signal storage circuit means being operative upon closure of said memory to store a memorization of said digital signal at that value that it possessed when the memory was closed, and said signal storage circuit means being further operative upon opening said memory to up-date the value of the stored signal to correspond with existant value of the digital signal developed by signal responsive circuit, means responsive to variations in said first signal for preventing said memory from closing, and means controlled by the signal stored by said signal storage circuit means for displaying the number indicated by the value of the stored signal.

14. In a piece counting system for determining the number of pieces having substantially equal weights in a given lot, means for developing a first digital signal having a first numerical value that is representative of the weight of an unknown number of said pieces in a lot, means for developing a second digital signal having a second numerical value that is representative of the weight of a known number of said pieces, counter means, means under the control of said first and second digital signals for recurrently advancing the count in said counter means from a predetermined starting count to coincidence with said second numerical value and for producing a pulse each time coincidence is reached until the summation of counts that said counter means has been advanced by becomes equal to or greater than said first numerical value, and means for counting said pulses.

15. In a piece counting system for determining the number of pieces having substantially equal weights in a given lot, means for developing a first digital signal having a first numerical value that is representative of the weight of an unknown number of said pieces in a lot, means for developing a second digital signal having a second numerical value that is representative of a known number of said pieces, counter means providing a third digital signal having a numerical value that is capable of being increased from a pre-selected value to coincidence with said second numerical value, means for increasing the numerical value of said third signal, comparator means for comparing said second and third digital signals, means under the control of the comparison provided by said comparator means and of said first digital signal for producing a pulse and for resetting said third digital signal to said pre-selected value each time coincidence is reached between said second numerical value and the numerical value of said third digital signal until the summation of the numerical values by which said third digital signal is increased becomes at least equal to said first numerical value, and means for counting said pulses.

16. In a piece counting system for determining the number of pieces having substantially equal weights in a given lot, means for developing a first digital signal having a first numerical value that is representative of the weight of an unknown number of said pieces in a lot, means for developing a second digital signal having a second numerical value that is representative of the weight of a known number of said pieces, first counter means providing a third digital signal having a third numerical value that is capable of being increased from a pre-selected value to coincidence with said second numerical value, means for increasing the numerical value of said third digital signal, first comparator means for comparing said second and third digital signals, means under the control of the comparison provided by said first comparator means for producing a pulse and for resetting said third digital signal to said pre-selected value each time coincidence is reached between said second and third numerical values, second counter means providing a summation of the increases in said third numerical value, second comparator means for comparing said first numerical value with the summation provided by said second counter means, and means under the control of the comparison provided by said second comparator means for terminating the production of said pulses when the summation provided by said second counter means becomes at least equal to said first numerical value.

17. In a piece counting system for determining the number of pieces having substantially equal weights in a given lot, means for developing a first digital signal having a first numerical value that is indicative of the weight of said given lot, means for developing a second digital signal having a second numerical value that is indicative of the weight of a known number of said pieces, first and second counter means, means under the control of said first and second signals for (a) advancing the count in said first counter means from a pre-selected starting count to coincidence with said first numerical value, (b) advancing the count in said second counter means from a pre-selected starting count to coincidence with said second numerical value, (c) resetting said second counter means to its starting count each time the count in said second counter means reaches coincidence with said second numerical value, and (d) producing a pulse each time coincidence is reached between the count in said second counter means and said second numerical value until the count in said first counter means becomes at least equal to said first numerical value, and means for counting said pulses.

18. In a piece counting system for determining the number of pieces having substantially equal weights in a given lot, means for developing a first digital signal having a first numerical value that is indicative of the weight of said lot, means for developing a second digital signal having a second numerical value that is indicative of the weight of a known number of said pieces, means for producing a train of first pulses, first and second counter means connected to receive said pulse train for concomitantly counting said pulses, first digital comparator means connected to said first counter means and to said second signal developing means for digitally comparing the said second signal with the number of pulses counted by said first counter means, means under the control of the comparison provided by said first digital comparator means (a) for resetting said first counter means to a pre-selected starting count each time the number of pulses counted by said first counter means reaches coincidence with said second numerical value and (b) for producing an output pulse each time coincidence is reached between said second numerical value and the number of pulses counted by said first counter means, second digital comparator means connected to said second counter means and to said first signal developing means for digitally comparing said first signal with the number of pulses counted by said second counter means, means under the control of the comparison provided by said second digital comparator means for terminating the production of said output pulses when the number of pulses counted by said second counter means becomes at least equal to said first numerical value, and means for counting said output pulses and for providing a numerical read-out that is a function of the counted number of said output pulses.

19. In a piece counting system for determining the number of pieces having substantially equal weights in a given lot, means including a weighing apparatus for weighing said given lot and for producing a first digital electrical signal that is indicative of the weight of said given lot, means for producing a second digital electrical signal that is indicative of the weight of a known number of said pieces, circuit means responsive to said first and second signals for producing a third digital electrical signal that is indicative of the number of the pieces at least in said given lot, means responsive to said third signal for displaying the number of pieces indicated by said third signal, said first signal being varied by variations in the weight of the pieces on said weighing apparatus, and means forming a part of said circuit means and being responsive to the variations of said first signal in either direction during a predetermined period to up-date the value of said third signal, said displaying means being responsive to the up-dating of the value of said third signal to up-date the display of the number corresponding with the up-dated value of said third signal.

20. In a piece counting system for determining the number of pieces having substantially equal weight in a given lot, means including a scale for weighing said given lot and for producing a first electrical signal that is indicative of the weight of said given lot, said scale having a structure that receives said given lot and that is displaced by the weight of the pieces in said given lot, means for producing a second electrical signal that is indicative of the weight of a known number of said pieces, means responsive to said first and second signals for displaying the number of pieces in at least said given lot, and means responsive to the weight-induced motion of said structure for up-dating the number displayed by said number-displaying means as long as said structure is in motion.

* * * * *